(12) United States Patent
Luo et al.

(10) Patent No.: US 10,299,257 B2
(45) Date of Patent: May 21, 2019

(54) TRANSMITTER MANAGEMENT UNDER TRANSMITTER UNCERTAINTY

(71) Applicant: QUALCOMM Incorporated, San Diego, CA (US)

(72) Inventors: Tao Luo, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 579 days.

(21) Appl. No.: 14/484,194

(22) Filed: Sep. 11, 2014

(65) Prior Publication Data

US 2015/0071220 A1  Mar. 12, 2015

Related U.S. Application Data

(60) Provisional application No. 61/972,132, filed on Mar. 28, 2014, provisional application No. 61/877,154, filed on Sep. 12, 2013.

(51) Int. Cl.
*H04W 72/04* (2009.01)
*H04L 5/00* (2006.01)
*H04W 16/14* (2009.01)

(52) U.S. Cl.
CPC ........... *H04W 72/042* (2013.01); *H04L 5/001* (2013.01); *H04L 5/0053* (2013.01); *H04W 16/14* (2013.01)

(58) Field of Classification Search
CPC ............................. H04W 72/042; H04L 5/001
See application file for complete search history.

(56) References Cited

U.S. PATENT DOCUMENTS

| 8,233,462 B2 | 7/2012 | Walton et al. | |
|---|---|---|---|
| 2006/0223541 A1* | 10/2006 | Famolari | H04W 72/02 455/450 |
| 2007/0230383 A1* | 10/2007 | Yune | H04L 1/0618 370/310 |

(Continued)

FOREIGN PATENT DOCUMENTS

| CN | 100574160 C | 12/2009 |
|---|---|---|
| EP | 1569372 A1 | 8/2005 |

(Continued)

OTHER PUBLICATIONS

International Search Report and Written Opinion—PCT/US2014/055418—ISA/EPO—dated Dec. 3, 2014.

(Continued)

*Primary Examiner* — Gregory B Sefcheck
*Assistant Examiner* — Jael M Ulysse
(74) *Attorney, Agent, or Firm* — Liem T. Do

(57) ABSTRACT

Management of transmitters is disclosed for conditions of transmission uncertainty that arises in operating over non-guaranteed transmission carriers that are required to perform listen-before-talk (LBT) processes and guaranteed transmission carriers that are LBT-exempt. Due to the hardware and software constraints, techniques are described to pre-prepare data and control transmissions or provide the transmitters additional time to prepare for such data and control transmissions based on the results of clear channel assessment (CCA) checks of the non-guaranteed transmission carriers.

16 Claims, 14 Drawing Sheets

(56) References Cited

U.S. PATENT DOCUMENTS

| | | | | |
|---|---|---|---|---|
| 2012/0264468 A1* | 10/2012 | Turtinen | ............ | H04L 5/001 455/509 |
| 2013/0143502 A1* | 6/2013 | Kazmi | ............ | H04W 88/06 455/62 |
| 2013/0163447 A1* | 6/2013 | Koskela | ............ | H04L 5/001 370/252 |
| 2013/0163543 A1* | 6/2013 | Freda | ............ | H04W 72/0406 370/329 |
| 2013/0165134 A1* | 6/2013 | Touag | ............ | H04W 72/0486 455/452.1 |
| 2013/0188552 A1 | 7/2013 | Kazmi et al. | | |
| 2013/0203458 A1* | 8/2013 | Charbit | ............ | H04W 52/34 455/522 |
| 2013/0208587 A1* | 8/2013 | Bala | ............ | H04W 16/14 370/230 |
| 2014/0036818 A1* | 2/2014 | Koskela | ............ | H04W 72/042 370/329 |
| 2014/0044105 A1* | 2/2014 | Bontu | ............ | H04L 5/001 370/336 |

FOREIGN PATENT DOCUMENTS

| | | |
|---|---|---|
| JP | 2014500685 A | 1/2014 |
| JP | 2014508468 A | 4/2014 |
| JP | 2015508958 A | 3/2015 |
| JP | 2015511077 A | 4/2015 |
| WO | WO-2005039105 A1 | 4/2005 |
| WO | WO-2012039656 A1 | 3/2012 |
| WO | WO-2012078565 A1 | 6/2012 |
| WO | WO-2012109195 A2 | 8/2012 |
| WO | WO-2013071506 A1 | 5/2013 |
| WO | WO-2013112983 A2 | 8/2013 |
| WO | WO-2013130793 A1 | 9/2013 |

OTHER PUBLICATIONS

Alcatel-Lucent et al., "Dynamic PDCCH Monitoring Set Configuration", 3GPP TSG-RAN WG1 #60, R1-100916, Feb. 26, 2010, Retrieved from the Internet: <URL: http://www.3gpp.org/ftp/tsg_ran/WG1_RL1/TSGR1_60/Docs/R1-100916.zip>, 4 pages.

Ericsson et al., "Work Plan Proposal for Study on Licensed-Assisted Access to Unlicensed Spectrum", 3GPP TSG RAN WG1 Meeting #78bis, R1-144225, Oct. 1, 2014, Retrieved from the Internet: <URL: http://www.3gpp.org/ftp/tsg_ran/WG1_RL1/TSGR1_78b/Docs/R1-144225.zip>, 3 pages.

Huawei et al., "Summary of a workshop on LTE in Unlicensed Spectrum [online]", 3GPP TSG RAN Meeting #63, RP-140060, Mar. 6, 2014, Retrieved from the Internet: URL: http://www.3gpp.org/ftp/tsg_ran/TSG_RAN/TSGR_63/Docs/RP-140060.zip>, 4 pages.

* cited by examiner

TRANSMITTER MANAGEMENT UNDER TRANSMITTER UNCERTAINTY

CROSS-REFERENCE TO RELATED APPLICATIONS

This application claims the benefit of U.S. Provisional Patent Application No. 61/877,154, entitled, "TRANSMITTER MANAGEMENT UNDER TRANSMITTER UNCERTAINTY," filed on Sep. 12, 2013, and U.S. Provisional Patent Application No. 61/972,132, entitled, "TRANSMITTER MANAGEMENT UNDER TRANSMITTER UNCERTAINTY," filed on Mar. 28, 2014, which are expressly incorporated by reference herein in their entirety.

BACKGROUND

Field

Aspects of the present disclosure relate generally to wireless communication systems, and more particularly, to transmitter management under transmitter uncertainty in long term evolution (LTE)/LTE-Advanced (LTE-A) communication system deployments with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes pre-preparing, at a transmitter, a plurality of candidate combined transmission waveforms of cross-carrier control information for one of at least one non-guaranteed transmission carriers and one or more of: control information and data for a guaranteed transmission carrier, receiving, at the transmitter, a transmission status for the at least one non-guaranteed transmission carriers, selecting, by the transmitter, a transmission waveform from the plurality of candidate combined transmission waveforms based on the transmission status, and transmitting, by the transmitter, the selected transmission waveform to a receiver.

In an additional aspect of the disclosure, a method of wireless communication includes pre-preparing, at a transmitter, a plurality of candidate singular transmission waveforms of one or more of: control information and data for a guaranteed transmission carrier, receiving, at the transmitter, a transmission status for at least one non-guaranteed transmission carriers, selecting, by the transmitter, a transmission waveform from the plurality of candidate singular transmission waveforms based on the transmission status, and transmitting, by the transmitter, the selected transmission waveform to a receiver.

In an additional aspect of the disclosure, a method of wireless communication includes entering, by a transmitter, a first subframe of a transmission frame, receiving, at the transmitter, a transmission status for at least one non-guaranteed transmission carriers associated with the transmitter, transmitting, by the transmitter, a non-time critical signal over a non-guaranteed transmission carrier for a fixed number of symbols of the first subframe, and transmitting, by the transmitter, a transmission waveform generated in response to the transmission status beginning at a first transmission symbol after the fixed number of symbols in the first subframe, wherein the transmission waveform is based on the transmission status.

In an additional aspect of the disclosure, a method of wireless communication includes entering, by a transmitter, a first subframe of a transmission frame, receiving, at the transmitter, a transmission status for at least one non-guaranteed transmission carriers associated with the transmitter, transmitting, by the transmitter, a non-time critical signal over a guaranteed transmission carrier for a fixed number of symbols of the first subframe, and transmitting, by the transmitter, a transmission waveform generated in response to the transmission status beginning at a first transmission symbol after the fixed number of symbols in the first subframe, wherein the transmission waveform is based on the transmission status.

In one aspect of the disclosure, a method of wireless communication includes pre-preparing, at a transmitter, one or more incremental samples for cross-carrier assignment, wherein the one or more incremental samples for cross-carrier assignment relate to at least one non-guaranteed transmission carrier associated with the transmitter, receiving, at the transmitter, a transmission status for the at least one non-guaranteed transmission carriers, selecting, by the transmitter based on the transmission status, one or more cross-carrier assignments from the one or more incremental samples for cross-carrier assignment, and transmitting, by the transmitter, the selected one or more cross-carrier assignments to a receiver.

In an additional aspect of the disclosure, a method of wireless communication includes entering an idle time by a secondary cell processor after transmission, generating, by the secondary cell processor, one or more duplicate assignment samples during the idle time, and transferring the one or more duplicate assignment samples to the primary cell processor at an end of the idle time.

In an additional aspect of the disclosure, a method of wireless communication includes receiving, at a mobile device, at least one cross-carrier assignment from a transmitter, wherein in the at least one cross-carrier assignment relates to at least one non-guaranteed transmission carrier, and monitoring, by the mobile device, for one or more channel reserving signals associated with the at least one non-guaranteed transmission carrier.

In an additional aspect of the disclosure, a method of wireless communication includes transmitting, by a base station, at least one cross-carrier assignment to a mobile device, wherein the at least one cross-carrier assignment relates to at least one non-guaranteed transmission carrier, monitoring, by the base station, for a channel reserving signal on the at least one non-guaranteed transmission carrier, and performing, by the base station, acknowledgement (ACK) or negative acknowledgement (NACK) detection from the mobile device, in response to detecting the channel reserving signal on the at least one non-guaranteed transmission carrier.

In an additional aspect of the disclosure, a method of wireless communication includes detecting, by a mobile device, at least one non-guaranteed transmission carrier for communication, and receiving, by the mobile device, a resource assignment associated with the at least one non-guaranteed transmission carrier only directly from a base station associated with the at least one non-guaranteed transmission carrier.

In an additional aspect of the disclosure, a method of wireless communication includes detecting, by a mobile device, at least one non-guaranteed transmission carrier for communication, and receiving, by the mobile device, a resource assignment associated with the at least one non-guaranteed transmission carrier only directly from a base station associated with the at least one non-guaranteed transmission carrier.

In an additional aspect of the disclosure, a method of wireless communication includes receiving, by a mobile device, control communications from a base station, and receiving, by the mobile device, one or more cross-carrier assignments in an enhanced control channel symbol after at least a first symbol of the control communications.

In an additional aspect of the disclosure, an apparatus configured for wireless communication includes means for pre-preparing, at a transmitter, one or more incremental samples for cross-carrier assignment, wherein the one or more incremental samples for cross-carrier assignment relate to at least one non-guaranteed transmission carrier associated with the transmitter, means for receiving, at the transmitter, a transmission status for the at least one non-guaranteed transmission carriers, means for selecting, by the transmitter based on the transmission status, one or more cross-carrier assignments from the one or more incremental samples for cross-carrier assignment, and means for transmitting, by the transmitter, the selected one or more cross-carrier assignments to a receiver.

In an additional aspect of the disclosure, an apparatus configured for wireless communication includes means for entering an idle time by a secondary cell processor after transmission, means for generating, by the secondary cell processor, one or more duplicate assignment samples during the idle time, and means for transferring the one or more duplicate assignment samples to the primary cell processor at an end of the idle time.

In an additional aspect of the disclosure, an apparatus configured for wireless communication includes means for receiving, at a mobile device, at least one cross-carrier assignment from a transmitter, wherein in the at least one cross-carrier assignment relates to at least one non-guaranteed transmission carrier, and means for monitoring, by the mobile device, for one or more channel reserving signals associated with the at least one non-guaranteed transmission carrier.

In an additional aspect of the disclosure, an apparatus configured for wireless communication includes means for transmitting, by a base station, at least one cross-carrier assignment to a mobile device, wherein the at least one cross-carrier assignment relates to at least one non-guaranteed transmission carrier, means for monitoring, by the base station, for a channel reserving signal on the at least one non-guaranteed transmission carrier, and means for performing, by the base station, acknowledgement (ACK) or negative acknowledgement (NACK) detection from the mobile device, in response to detecting the channel reserving signal on the at least one non-guaranteed transmission carrier.

In an additional aspect of the disclosure, an apparatus configured for wireless communication includes means for detecting, by a mobile device, at least one non-guaranteed transmission carrier for communication, and means for receiving, by the mobile device, a resource assignment associated with the at least one non-guaranteed transmission carrier only directly from a base station associated with the at least one non-guaranteed transmission carrier.

In an additional aspect of the disclosure, an apparatus configured for wireless communication includes means for detecting, by a mobile device, at least one non-guaranteed transmission carrier for communication, and means for receiving, by the mobile device, a resource assignment associated with the at least one non-guaranteed transmission carrier only directly from a base station associated with the at least one non-guaranteed transmission carrier.

In an additional aspect of the disclosure, an apparatus configured for wireless communication includes means for receiving, by a mobile device, control communications from a base station, and means for receiving, by the mobile device, one or more cross-carrier assignments in an enhanced control channel symbol after at least a first symbol of the control communications.

In an additional aspect of the disclosure, a computer program product has a computer-readable medium having program code recorded thereon. This program code includes code to pre-prepare, at a transmitter, one or more incremental samples for cross-carrier assignment, wherein the one or more incremental samples for cross-carrier assignment relate to at least one non-guaranteed transmission carrier associated with the transmitter, code to receive, at the transmitter, a transmission status for the at least one non-guaranteed transmission carriers, code to select, by the transmitter based on the transmission status, one or more cross-carrier assignments from the one or more incremental samples for cross-carrier assignment, and code to transmit, by the transmitter, the selected one or more cross-carrier assignments to a receiver.

In an additional aspect of the disclosure, a computer program product has a computer-readable medium having program code recorded thereon. This program code includes code to enter an idle time by a secondary cell processor after transmission, code to generate, by the secondary cell processor, one or more duplicate assignment samples during the idle time, and code to transfer the one or more duplicate assignment samples to the primary cell processor at an end of the idle time.

In an additional aspect of the disclosure, a computer program product has a computer-readable medium having program code recorded thereon. This program code includes code to receive, at a mobile device, at least one cross-carrier assignment from a transmitter, wherein in the at least one cross-carrier assignment relates to at least one non-guaranteed transmission carrier, and code to monitor, by the mobile device, for one or more channel reserving signals associated with the at least one non-guaranteed transmission carrier.

In an additional aspect of the disclosure, a computer program product has a computer-readable medium having program code recorded thereon. This program code includes code to transmit, by a base station, at least one cross-carrier assignment to a mobile device, wherein the at least one cross-carrier assignment relates to at least one non-guaranteed transmission carrier, code to monitor, by the base station, for a channel reserving signal on the at least one non-guaranteed transmission carrier, and code to perform, by the base station, acknowledgement (ACK) or negative acknowledgement (NACK) detection from the mobile device, in response to detecting the channel reserving signal on the at least one non-guaranteed transmission carrier.

In an additional aspect of the disclosure, a computer program product has a computer-readable medium having program code recorded thereon. This program code includes code to detect, by a mobile device, at least one non-guaranteed transmission carrier for communication, and code to receive, by the mobile device, a resource assignment associated with the at least one non-guaranteed transmission carrier only directly from a base station associated with the at least one non-guaranteed transmission carrier.

In an additional aspect of the disclosure, a computer program product has a computer-readable medium having program code recorded thereon. This program code includes code to detect, by a mobile device, at least one non-guaranteed transmission carrier for communication, and code to receive, by the mobile device, a resource assignment associated with the at least one non-guaranteed transmission carrier only directly from a base station associated with the at least one non-guaranteed transmission carrier.

In an additional aspect of the disclosure, a computer program product has a computer-readable medium having program code recorded thereon. This program code includes code to receive, by a mobile device, control communications from a base station, and code to receive, by the mobile device, one or more cross-carrier assignments in an enhanced control channel symbol after at least a first symbol of the control communications.

In an additional aspect of the disclosure, an apparatus includes at least one processor and a memory coupled to the processor. The processor is configured to pre-prepare, at a transmitter, one or more incremental samples for cross-carrier assignment, wherein the one or more incremental samples for cross-carrier assignment relate to at least one non-guaranteed transmission carrier associated with the transmitter, to receive, at the transmitter, a transmission status for the at least one non-guaranteed transmission carriers, to select, by the transmitter based on the transmission status, one or more cross-carrier assignments from the one or more incremental samples for cross-carrier assignment, and to transmit, by the transmitter, the selected one or more cross-carrier assignments to a receiver.

In an additional aspect of the disclosure, an apparatus includes at least one processor and a memory coupled to the processor. The processor is configured to enter an idle time by a secondary cell processor after transmission, to generate, by the secondary cell processor, one or more duplicate assignment samples during the idle time, and to transfer the one or more duplicate assignment samples to the primary cell processor at an end of the idle time.

In an additional aspect of the disclosure, an apparatus includes at least one processor and a memory coupled to the processor. The processor is configured to receive, at a mobile device, at least one cross-carrier assignment from a transmitter, wherein in the at least one cross-carrier assignment relates to at least one non-guaranteed transmission carrier, and to monitor, by the mobile device, for one or more channel reserving signals associated with the at least one non-guaranteed transmission carrier.

In an additional aspect of the disclosure, an apparatus includes at least one processor and a memory coupled to the processor. The processor is configured to transmit, by a base station, at least one cross-carrier assignment to a mobile device, wherein the at least one cross-carrier assignment relates to at least one non-guaranteed transmission carrier, to monitor, by the base station, for a channel reserving signal on the at least one non-guaranteed transmission carrier, and to perform, by the base station, acknowledgement (ACK) or negative acknowledgement (NACK) detection from the mobile device, in response to detecting the channel reserving signal on the at least one non-guaranteed transmission carrier.

In an additional aspect of the disclosure, an apparatus includes at least one processor and a memory coupled to the processor. The processor is configured to detect, by a mobile device, at least one non-guaranteed transmission carrier for communication, and to receive, by the mobile device, a resource assignment associated with the at least one non-guaranteed transmission carrier only directly from a base station associated with the at least one non-guaranteed transmission carrier.

In an additional aspect of the disclosure, an apparatus includes at least one processor and a memory coupled to the processor. The processor is configured to detect, by a mobile device, at least one non-guaranteed transmission carrier for communication, and to receive, by the mobile device, a resource assignment associated with the at least one non-guaranteed transmission carrier only directly from a base station associated with the at least one non-guaranteed transmission carrier.

In an additional aspect of the disclosure, an apparatus includes at least one processor and a memory coupled to the processor. The processor is configured to receive, by a mobile device, control communications from a base station, and to receive, by the mobile device, one or more cross-carrier assignments in an enhanced control channel symbol after at least a first symbol of the control communications.

In one aspect of the disclosure, a method of wireless communication includes pre-preparing, at a transmitter, a plurality of candidate transmission waveforms for transmission over a guaranteed transmission carrier, wherein the plurality of candidate transmission waveforms is related to at least one non-guaranteed transmission carriers associated with the transmitter, receiving, at the transmitter, a transmission status for the at least one non-guaranteed transmission carriers, selecting, by the transmitter, a transmission waveform from the plurality of candidate transmission waveforms based on the transmission status, and transmitting, by the transmitter, the selected transmission waveform to a receiver.

In an additional aspect of the disclosure, a method of wireless communication includes entering, by a transmitter, a first subframe of a transmission frame, receiving, at the transmitter, a transmission status for at least one non-guaranteed transmission carriers associated with the transmitter, transmitting, by the transmitter, a non-time critical signal over a guaranteed transmission carrier for a fixed number of symbols of the first subframe, and transmitting, by the transmitter, a transmission waveform generated in response to the transmission status beginning at a first transmission symbol after the fixed number of symbols in the first subframe, wherein the transmission waveform is based on the transmission status.

In an additional aspect of the disclosure, an apparatus configured for wireless communication includes means for pre-preparing, at a transmitter, a plurality of candidate transmission waveforms for transmission over a guaranteed transmission carrier, wherein the plurality of candidate transmission waveforms is related to at least one non-guaranteed transmission carriers associated with the transmitter, means for receiving, at the transmitter, a transmission status for the at least one non-guaranteed transmission carriers, means for selecting, by the transmitter, a transmission waveform from the plurality of candidate transmission waveforms based on the transmission status, and means for transmitting, by the transmitter, the selected transmission waveform to a receiver.

In an additional aspect of the disclosure, an apparatus configured for wireless communication includes means for entering, by a transmitter, a first subframe of a transmission frame, means for receiving, at the transmitter, a transmission status for at least one non-guaranteed transmission carriers associated with the transmitter, means for transmitting, by the transmitter, a non-time critical signal over a guaranteed transmission carrier for a fixed number of symbols of the first subframe, and means for transmitting, by the transmitter, a transmission waveform generated in response to the transmission status beginning at a first transmission symbol after the fixed number of symbols in the first subframe, wherein the transmission waveform is based on the transmission status.

In an additional aspect of the disclosure, a computer program product for wireless communications in a wireless network including a non-transitory computer-readable medium having program code recorded thereon. The program code includes code to pre-prepare, at a transmitter, a plurality of candidate transmission waveforms for transmission over a guaranteed transmission carrier, wherein the plurality of candidate transmission waveforms is related to at least one non-guaranteed transmission carriers associated with the transmitter, code to receive, at the transmitter, a transmission status for the at least one non-guaranteed transmission carriers, code to select, by the transmitter, a transmission waveform from the plurality of candidate transmission waveforms based on the transmission status, and code to transmit, by the transmitter, the selected transmission waveform to a receiver.

In an additional aspect of the disclosure, a computer program product for wireless communications in a wireless network including a non-transitory computer-readable medium having program code recorded thereon. The program code includes code to enter, by a transmitter, a first subframe of a transmission frame, code to receive, at the transmitter, a transmission status for at least one non-guaranteed transmission carriers associated with the transmitter, code to transmit, by the transmitter, a non-time critical signal over a guaranteed transmission carrier for a fixed number of symbols of the first subframe, and code to transmit, by the transmitter, a transmission waveform generated in response to the transmission status beginning at a first transmission symbol after the fixed number of symbols in the first subframe, wherein the transmission waveform is based on the transmission status.

In an additional aspect of the disclosure, an apparatus configured for wireless communication includes at least one processor and a memory coupled to the at least one processor. The processor is configured to pre-prepare, at a transmitter, a plurality of candidate transmission waveforms for transmission over a guaranteed transmission carrier, wherein the plurality of candidate transmission waveforms is related to at least one non-guaranteed transmission carriers associated with the transmitter, to receive, at the transmitter, a transmission status for the at least one non-guaranteed transmission carriers, to select, by the transmitter, a transmission waveform from the plurality of candidate transmission waveforms based on the transmission status, and to transmit, by the transmitter, the selected transmission waveform to a receiver.

In an additional aspect of the disclosure, an apparatus configured for wireless communication includes at least one processor and a memory coupled to the at least one processor. The processor is configured to enter, by a transmitter, a first subframe of a transmission frame, to receive, at the transmitter, a transmission status for at least one non-guaranteed transmission carriers associated with the transmitter, to transmit, by the transmitter, a non-time critical signal over a guaranteed transmission carrier for a fixed number of symbols of the first subframe, and to transmit, by the transmitter, a transmission waveform generated in response to the transmission status beginning at a first transmission symbol after the fixed number of symbols in the first subframe, wherein the transmission waveform is based on the transmission status.

DETAILED DESCRIPTION

Figure 1:
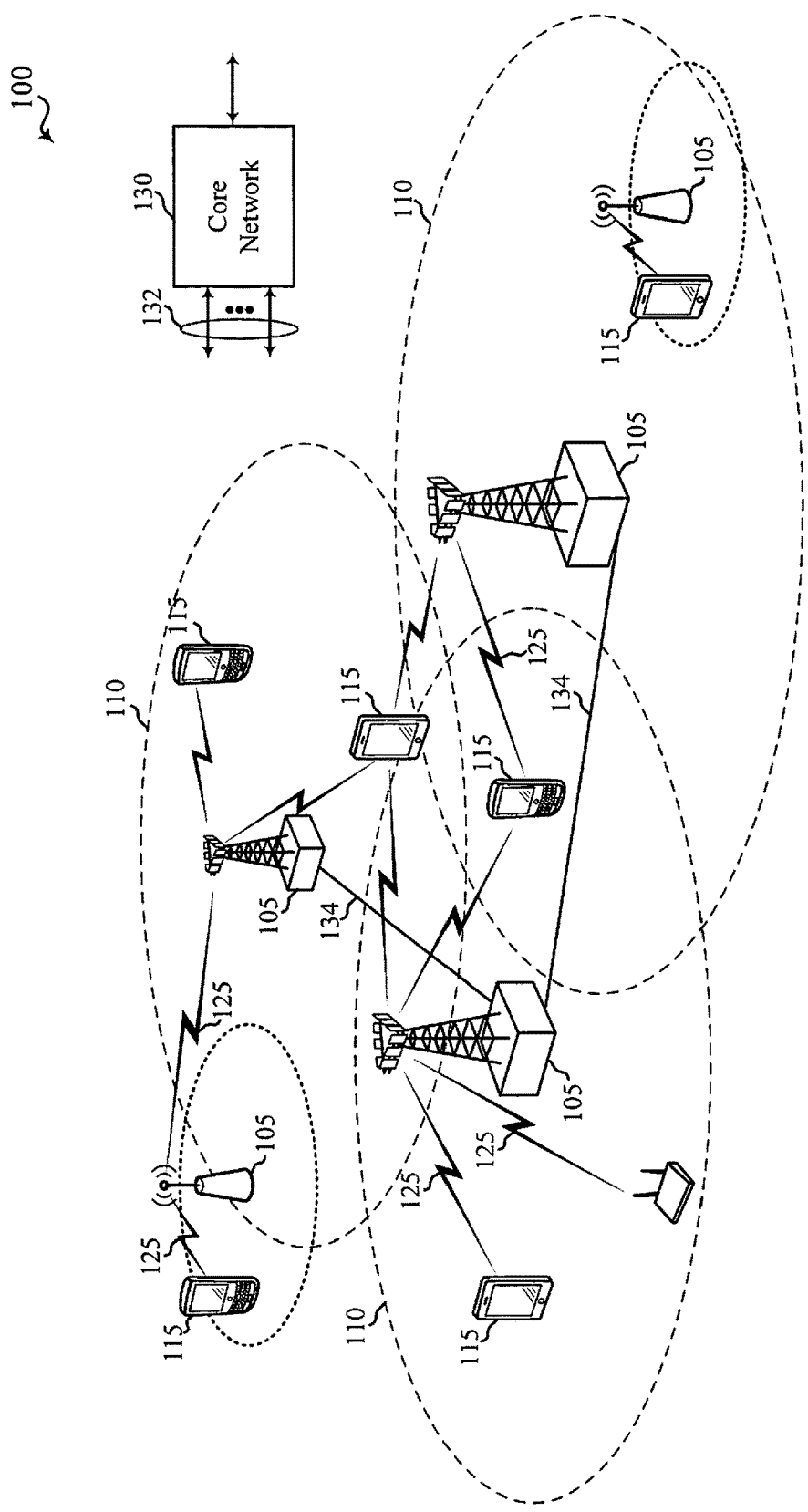
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for Operators have so far looked at WiFi as the primary mechanism to use unlicensed spectrum to relieve ever increasing levels of congestion in cellular networks. However, a new carrier type (NCT) based on LTE/LTE-A including unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A deployment with unlicensed spectrum (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.). In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network. In this case, there may be a loose interworking between LTE/LTE-A with and without unlicensed spectrum based on RLC-level aggregation with co-located cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A/ network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-15.

Figure 2A:
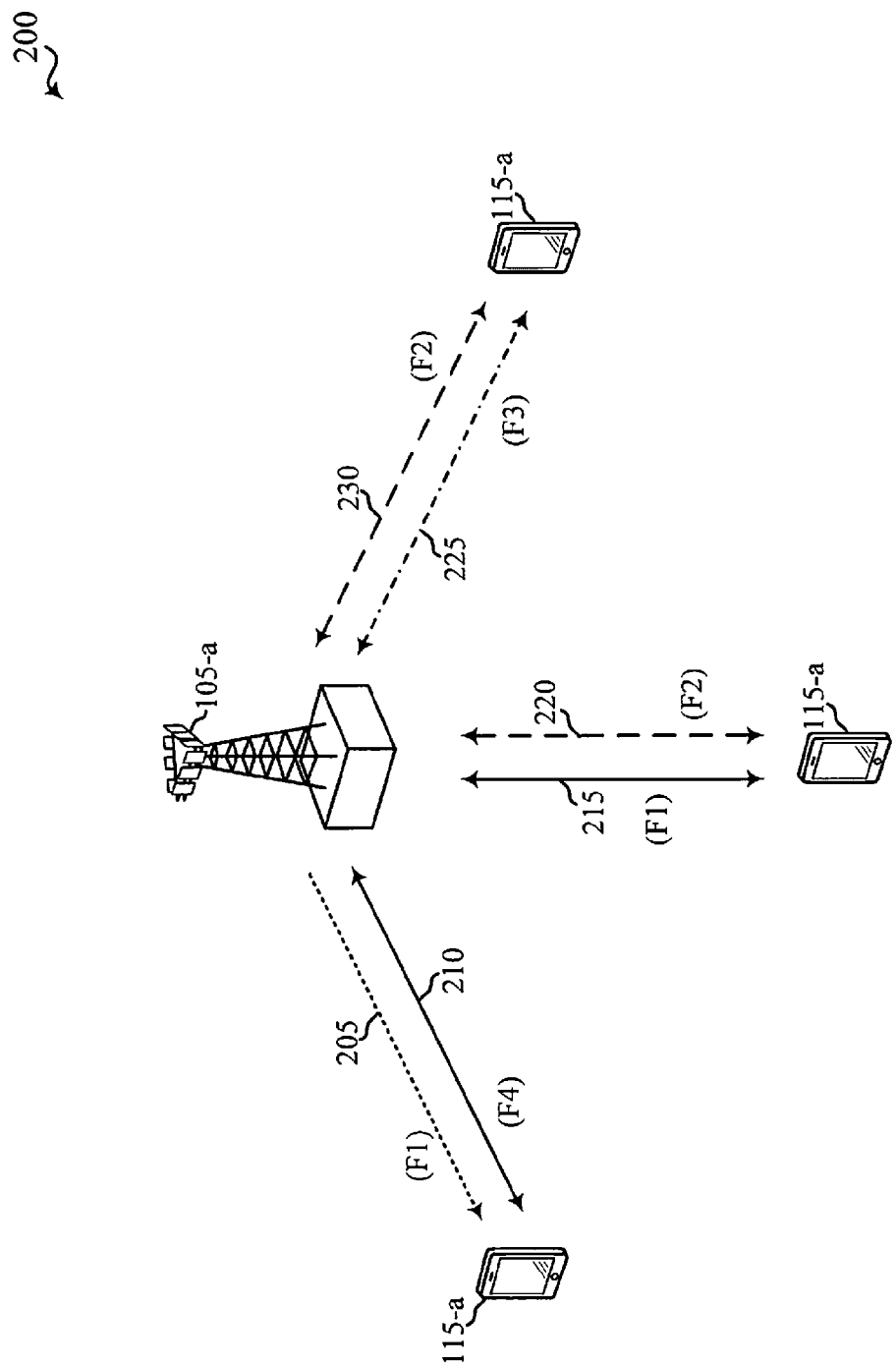
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-*a* may be an example of the base stations 105 of FIG. 1, while the UEs 115-*a* may be examples of the UEs 115 of FIG. 1.

In the example of a supplemental downlink mode in diagram 200, the base station 105-*a* may transmit OFDMA communications signals to a UE 115-*a* using a downlink 205. The downlink 205 is associated with a frequency F1 in an unlicensed spectrum. The base station 105-*a* may transmit OFDMA communications signals to the same UE 115-*a* using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
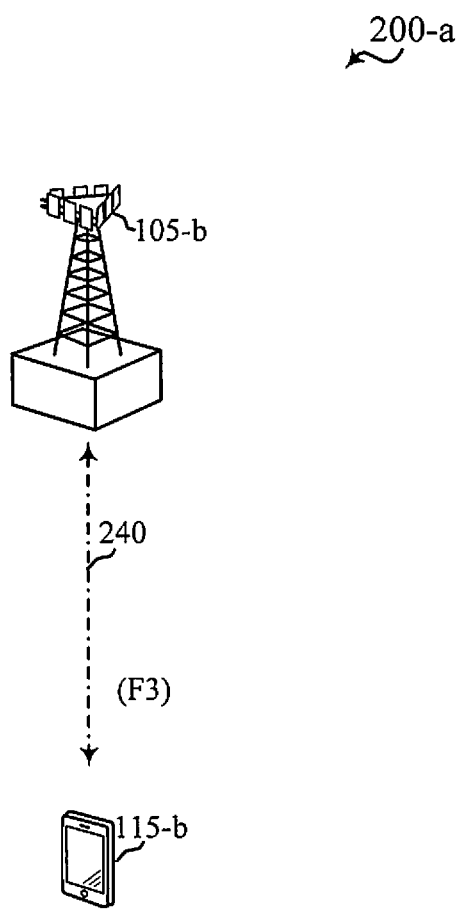
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A with unlicensed spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
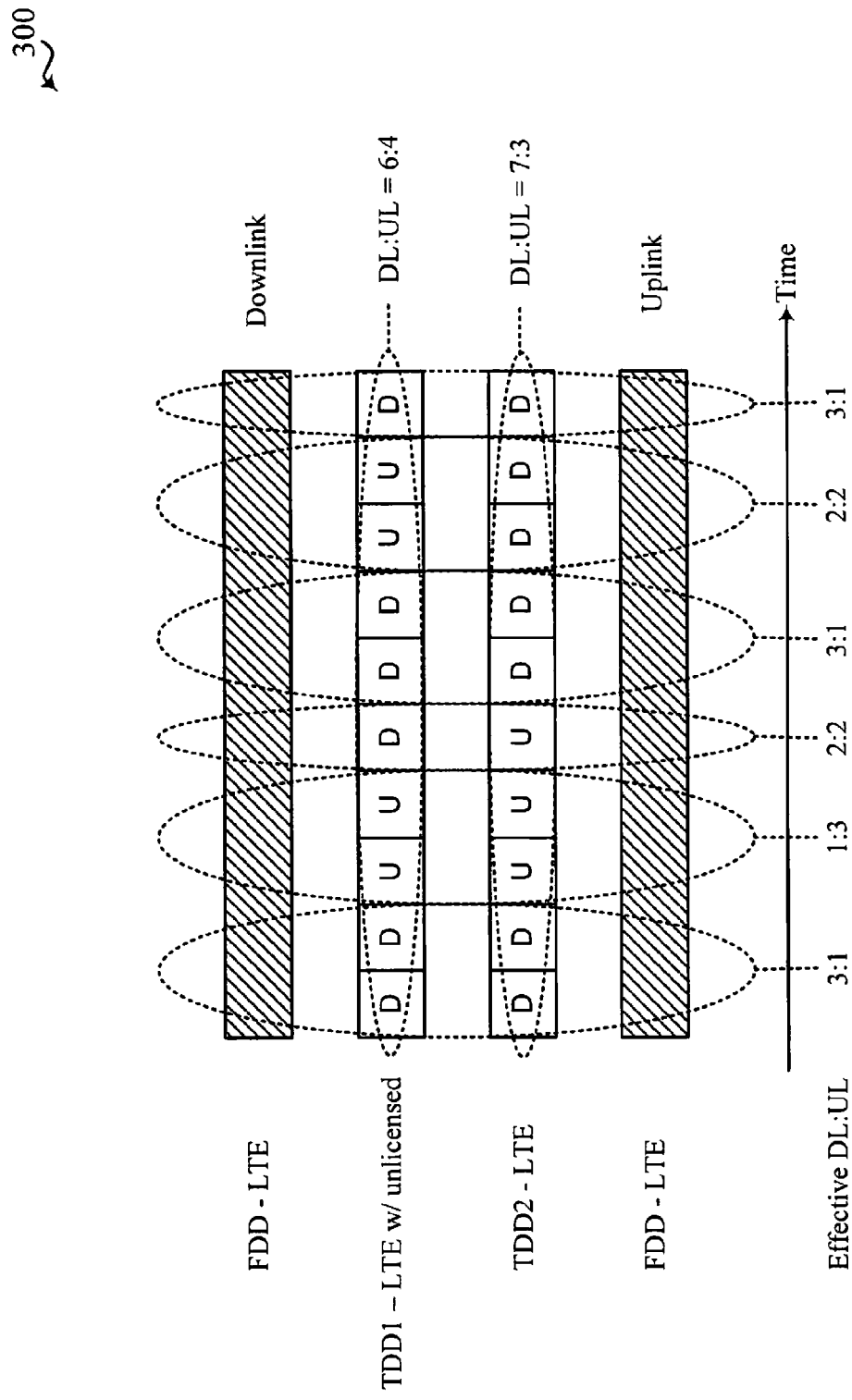
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
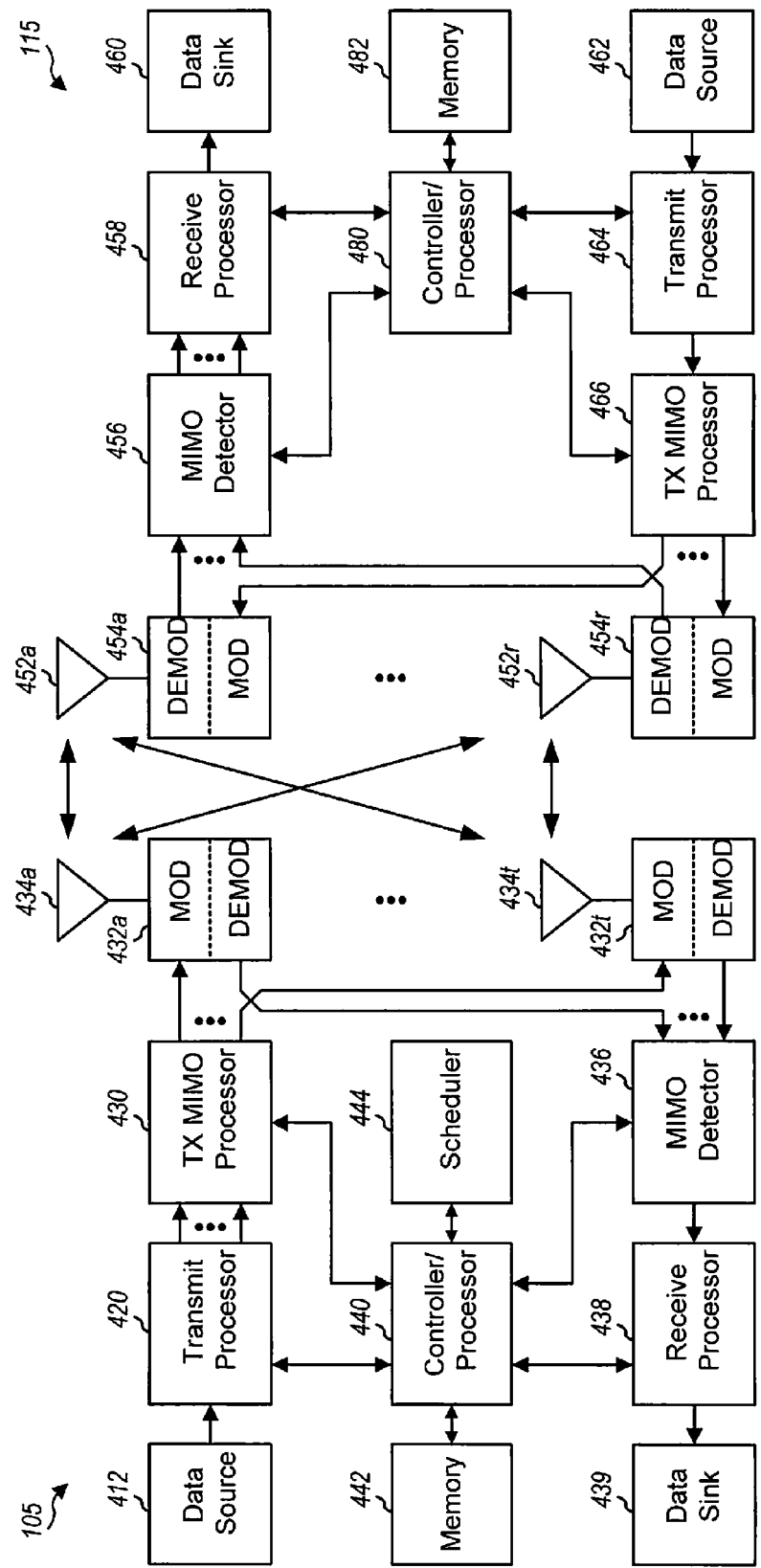
FIG. 4 is a block diagram illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 5A, 5B, 7A, 8A, 8B, 10, and 12-15, and/or other processes for the techniques described herein. The memories 442 and 482 may store data and program codes for the eNB 105 and the UE 115, respectively. A scheduler 444 may schedule UEs for data transmission on the downlink and/or uplink.

Various issues arise in LTE/LTE-A deployments with unlicensed spectrum attempting to perform singular communication operations over a coordination of both licensed and unlicensed spectrum. One such issue arises with transmissions that occur or are planned to occur over the unlicensed bands. As transmission over the certain unlicensed bands in LTE/LTE-A deployments with unlicensed spectrum may first require a listen-before-talk (LBT) procedure, when there is an LBT requirement, a transmitter may not be able to transmit if the clear channel assessment (CCA) procedure does not successfully detect a clear channel. With the addition of carrier aggregation to a particular LTE/LTE-A deployments with unlicensed spectrum, there may be uncertainty with regard to which carriers may be used by a particular transmitter for communication transmissions. For example, in carrier aggregation between two carriers, there are four combinations of potential LBT requirements:

Case 1: carrier A (LBT) and carrier B (LBT)
    Case 2: carrier A (LBT) and carrier B (LBT-exempt)
    Case 3: carrier A (LBT-exempt) and carrier B (LBT)
    Case 4: carrier A (LBT-exempt) and carrier B (LBT-exempt)

As more carriers are added to the carrier aggregation configuration, with each new carrier subject to LBT requirements, there would be many more potential combinations. For example, because each carrier may be either LBT-exempt or have the LBT requirement at any given time, for y number of carriers, there would be potentially $2^y$ potential combinations.

It should be noted that "LBT-exempt" includes operations involving carrier frequencies in the unlicensed spectrum that do not require LBT and any carrier frequency in licensed spectrum.

In Cases 2 and 3, in which at least one of the carriers includes an LBT-exempt status, one option could be to use the LBT-exempt carrier as the primary component carrier (PCC) to transmit all control information through cross-carrier control. In contrast, for Case 1, in which both carriers require LBT, a first option may be for one of the carriers to be selected as the PCC for transmission of control information through cross-carrier control, while a second option may provide for each of the carriers to transmit their control information without cross-carrier control.

In the options that provide for cross-carrier control (e.g., Case 1-first option, Case 2 and Case 3), one carrier is selected as the PCC to transmit control information for the other carrier(s). This PCC may also have control and data to send for its own UEs, that is, the UEs for which primary communication is occurring over the selected PCC. In Cases 2 and 3, in which at least one of the carriers includes LBT-exempt status, there may be four different operational combinations of control and data to transmit.

Combination 1: cross-carrier control+control/data for itself
Combination 2: cross-carrier control only
Combination 3: control/data for itself
Combination 4: no control and data to transmit.

If the choice of transmission is between Combinations 1 and 3, that means that there is uncertainty over whether there will be cross-carrier control or not due to the LBT requirement on one of the carriers. If the transmitter detects a clear CCA, then cross-carrier control may be unnecessary, while if the CCA fails, then cross-carrier control may indeed be necessary. For example, in attempting to detect a clear CCA, the energy detection results achieved by a particular transmitter may be compared to a predetermined threshold energy level (e.g., −62 dBm). Therefore, if the detected energy on the channel is ≥−62 dBm, transmissions are blocked from supplemental downlink from the transmitter. However, if the detected energy on the channel is <−62 dBm, the transmitter will proceed with supplemental downlink transmissions, including CUBS.

The nature and limitations of some software (SW)/hardware (HW) components may provide constraints one signal transmissions. For example, from the CCA check until the first CUBS transmission may have as little as 10 µs turn-around time. Moreover, because the gap between detection of a clear CCA and transmission of the PDCCH from the PCC depends on how many CUBS are transmitted. When there may only be a single CUBS transmission, there may not be sufficient time for the HW to prepare the cross-carrier grant.

When transmitter wants to transmit at time 1, it may need to know the exact signal to transmit at time t1 −β, where β may be up to a few hundred µs, for example, 355 µs may be a typical long β. This extended period may be due to various causes, such as encoding delay, warm-up times, and the like. In contrast, a transmitter may perform a CCA check only x µs before the actual transmission. For example, x could be just a few µs, such as 60-70 µs. Therefore, when a transmitter detects a clear CCA, it may not, in fact, have time to prepare transmissions. The impact may be more severe when data transmission is scheduled to start at symbol 0.

Figures 5A, 5B:
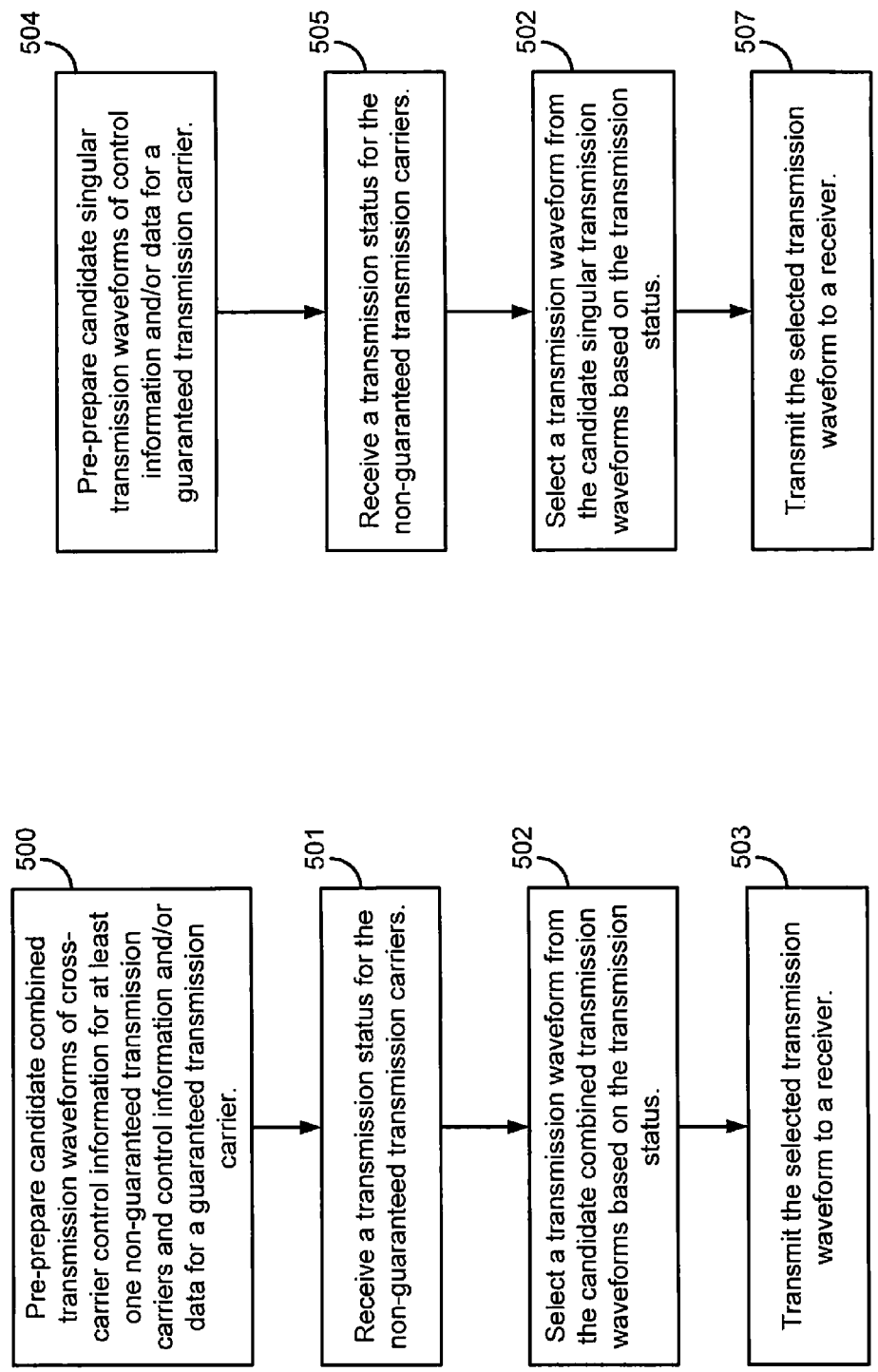
FIGS. 5A and 5B are functional block diagrams illustrating example blocks executed to implement aspects of the present disclosure.

In order to address the potential failure of a transmitter to prepare transmission waveforms for timely transmission after detecting a clear CCA, aspects of the present disclosure pre-prepare transmission waveforms. FIG. 5A is a functional block diagram illustrating example blocks executed to implement one aspect of the present disclosure. At block 500, a transmitter pre-prepares candidate combined transmission waveforms of cross-carrier control information for at least one non-guaranteed transmission carriers and control information and/or data for a guaranteed transmission carrier. Such an example transmitter is deployed and configured for communication over an LTE/LTE-A communication system with unlicensed spectrum. The various carriers associated with the transmitter in a carrier aggregation configuration include both guaranteed transmission licensed spectrum carriers, which are LBT-exempt, and one or more additional unlicensed spectrum carriers, which may require LBT operations by performing CCA checks for clear transmissions on the non-guaranteed carriers. The transmitter may include cross-carrier control information in transmission waveforms transmitted over the guaranteed transmission carrier for any of the non-guaranteed transmission carriers that have clear CCA checks. As such, there are multiple potential candidate waveforms that depend on the results of the CCA operations. The transmitter, at block 500, pre-prepares each of these potential candidate transmission waveforms for every potential combination of clear or unclear CCA check.

At block 501, the transmitter receives the transmission status for the non-guaranteed transmission carriers. The transmission status includes the results of CCA checks for each of the non-guaranteed transmission carriers. Based on the transmission status received for each of the non-guaranteed transmission carriers, the transmitter selects, at block 502, a transmission waveform of the candidate combined transmission waveforms. The particular pre-prepared waveform selected matches the specific combination of transmission statuses received. In a first option, combination and switching of the pre-prepared waveforms may occur at baseband depending on the results of the CCA, while a second option would provide combination and switching of the pre-prepared waveforms at RF depending on the CCA results. The transmitter then transmits, at block 503, the selected transmission waveform to a receiver.

In an additional aspect of the present disclosure, the pre-preparation of transmission waveforms includes singular transmission waveforms for guaranteed transmissions carriers. FIG. 5B is a functional block diagram illustrating example blocks executed to implement one aspect of the present disclosure. At block 504, a transmitter pre-prepares candidate singular transmission waveforms that include control information and/or data for the guaranteed transmission carrier. The singular transmission waveforms may represent a self-scheduling of the guaranteed transmission carrier.

At block 505, the transmitter receives the transmission status for the non-guaranteed transmission carriers. The transmission status includes the results of CCA checks for each of the non-guaranteed transmission carriers. Based on the transmission status received for each of the non-guaranteed transmission carriers, the transmitter selects, at block 505, a transmission waveform of the candidate singular transmission waveforms. The particular pre-prepared waveform selected matches the specific combination of transmission statuses received. The transmitter then transmits, at block 506, the selected transmission waveform to a receiver.

Pre-preparation of transmission waveforms may be used to accommodate the timing differential between the time that a transmitter typically uses to prepare transmissions and the time typically used for completing LBT procedures, which may not allow enough time for a transmitter to prepare the appropriate transmission in response to the resulting LBT operation. In one example that generates the potential waveforms at baseband, when preparing the transmission, such as the PDCCH or EPDCCH, it may be possible to generate only an incremental baseband sample, such as the incremental in-phase (I) and quadrature (Q) samples for the cross-carrier assignments, such that just the incremental IQ samples can be added after inverse fast Fourier transform (IFFT) to the IQ samples of the other PDCCH or EPDCCH assignments.

Various aspects of the present disclosure provide for the transmitter to start pre-preparing transmissions for multiple potential combinations, each of which may be a possible complete transmit waveform. Thus, as referenced above, when the potential transmission combinations are between Combination 1 (cross-carrier control+control/data for itself) and Combination 3 (control/data for itself), the transmitter would begin pre-preparing the transmissions for both Combination 1, a waveform that includes both the cross-carrier control and the control/data for its own UEs, and Combination 3, a waveform that includes only the control/data for its own UEs, while the CCA check is pending. Pre-preparation here would mean beginning the encoding and/or multiplexing operations at time t1 −X, and/or buffer the waveforms for each of the prepared combinations. Where X would be at least sufficient time to prepare the packet for transmission. The data may be prepared at baseband and then gated at radio frequency (RF) level when the CCA check does not pass. Based on the resulting CCA determination, the transmitter would then select one of the prepared waveforms to transmit.

Figure 6:
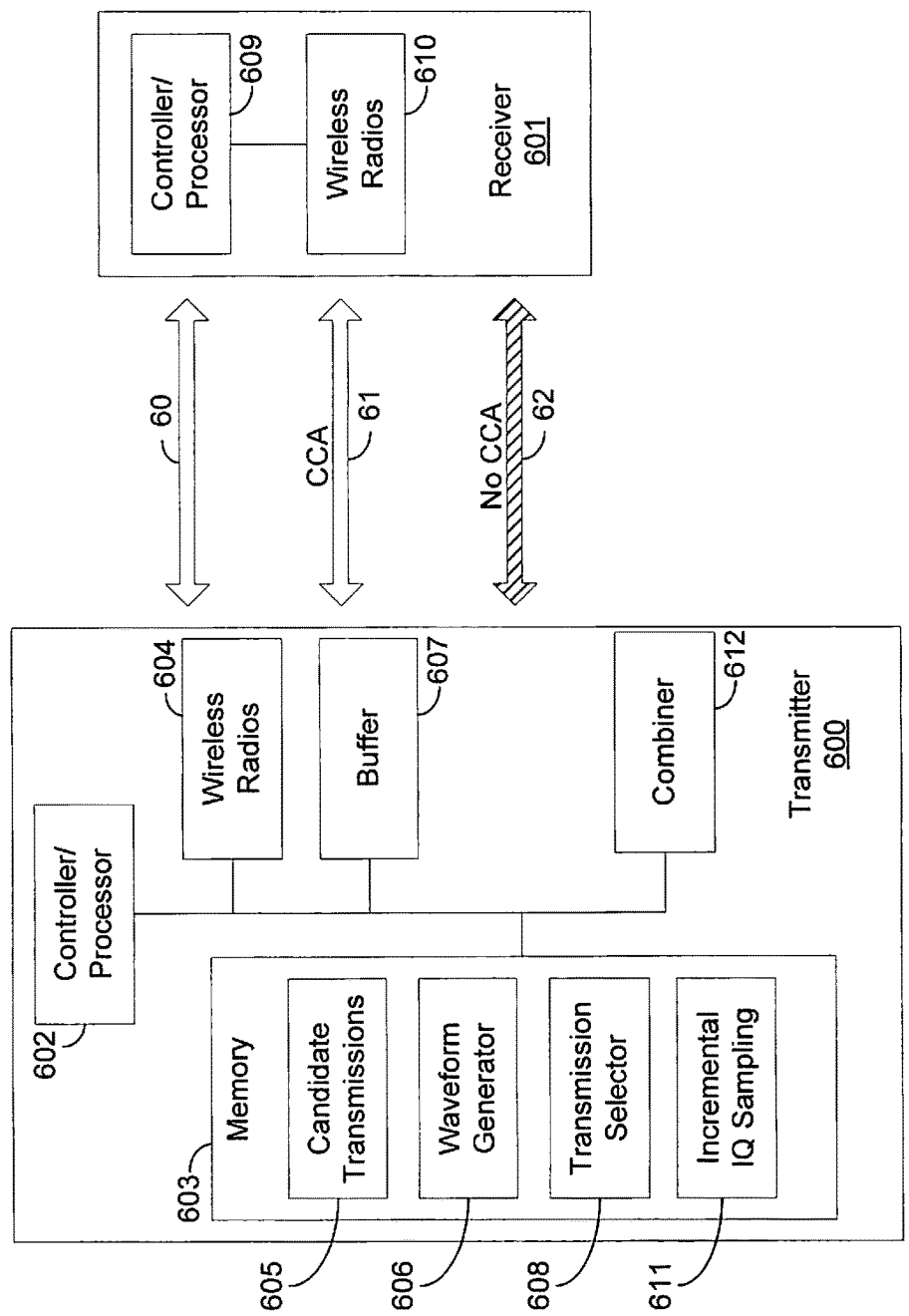
FIG. 6 is a block diagram illustrating a transmitter configured according to one aspect of the present disclosure.

FIG. 6 is a block diagram illustrating a transmitter 600 configured according to one aspect of the present disclosure. Transmitter 600, which may be an eNB, base station, or access point providing communication to a mobile device or UE, or may be a mobile device or UE providing communication to an eNB, base station, or access point. Transmitter 600 conducts transmission communications to receiver 601. Receiver 601 is the receiving entity which, depending on the network entity of transmitter 600, may be any of an eNB, base station, access point, mobile device, UE, or the like. Communication between transmitter 600 and receiver 601 occurs over a collection of carriers, carriers 60-62, operated according to a carrier aggregation implementation. Carrier 60 is located within a licensed frequency spectrum and is, therefore, LBT-exempt. Carriers 61-62 are each located within an unlicensed frequency spectrum that requires LBT operations prior to transmission.

Transmitter 600 includes controller/processor 602 which executes the code or logic stored in memory 603 that provides the features and functionalities of transmitter 600. Controller/processor 602 also controls the hardware components of transmitter 600, including wireless radios 604, used to conduct wireless communication over carriers 60-62. When preparing to transmit cross-carrier assignment information to receiver 601, transmitter 600 accesses candidate transmissions data 605, stored in memory 603, to determine each of the communication possibilities across carriers 60-62 dependent on the CCA results or transmission status of carriers 61-62. Carrier 60 is selected as the PCC to potentially carry cross-carrier control information for transmissions on unlicensed carriers 61 and 62. Controller/processor 602 executes waveform generator logic 606, stored in memory 603, to pre-prepare each complete transmission waveform for each of the possible candidate transmissions, assuming all of the combinations of CCA results for carriers 61 and 62. Controller/processor 602 may also execute incremental IQ sampling logic 611, stored in memory 603. The execution environment of incremental IQ sampling logic 611 generates only the incremental baseband signals that may be used for the cross-carrier assignments within a transmission, such as a PDCCH or EPDCCH, for each possible combination of open transmission carriers. Each of the candidate transmission waveforms and incremental IQ samples for cross-carrier assignment is then stored in buffer 607, which may be a part of memory 603 or may be a separate memory location within transmitter 600.

In preparation for transmission, transmitter 600 performs CCA checks on carriers 61 and 62. For purposes of the example illustrated in FIG. 6, transmitter 600 detects a clear CCA for carrier 61, but detects CCA failure for carrier 62. Accordingly, transmitter 600 is clear to transmit on carrier 61 but not on carrier 62. Based on this transmission status received in response to the CCA checks, controller/processor 602 executes transmission selector logic 608 to select the pre-prepared transmission waveform in buffer 607 that corresponds to a clear CCA for carrier 61 and a failed CCA for carrier 62. In preparing the control channel, such as PDCCH or EPDCCH, controller/processor 602 selects the particular selects to combine the incremental IQ samples for cross-carrier assignment to carrier 61 in the PDCCH prepare for carrier 60 by using combiner 612 after performing IFFT on the IQ samples of the other PDCCH or EPDCCH assignments. The selected corresponding, combined pre-prepared transmission waveform including the control transmission, such as the prepared PDCCH or EPDCCH, is then transmitted through wireless radios 604, under control of controller/processor 602 to receiver 601 over carrier 60, the guaranteed transmission carrier. Receiver 601 may then receive the transmissions through wireless radios 610 under control of controller/processor 609.

It should be noted that each CCA check is generally valid and applicable for 10 ms or an entire radio frame before another CCA check is performed. Therefore, once a CCA determination is made, the transmitter may cease the pre-preparation for each potential combination waveform in subsequent subframes until the next CCA requirement arises.

It should further be noted that, as the number of carriers that include LBT requirements increases, the number of potential combinations may become very large. Thus, adequate processing and memory resources would be available for the various aspects of the present disclosure that implement such a pre-preparation procedure.

Alternative aspects of the present disclosure may also provide for the transmitter to start separately preparing transmissions for each different carrier. Thus, as referenced above, when the potential transmission combinations are between Combination 1 (cross-carrier control+control/data for itself) and Combination 3 (control/data for itself), the transmitter would begin preparing the transmissions for the control/data for itself and separately preparing the transmissions for the cross-carrier control. Each such prepared transmission may have its own independent fast Fourier transfer (FFT) operation, as if it were the only signal to transmit. Once a failed CCA is detected, the transmitter uses a combining operation across the different FFT outputs in order to combine the separate transmission waveforms into a single transmission. Therefore, referring again to the above example, when a control/data transmission waveform for itself is prepared using a first FFT operation and a separate cross-carrier control transmission waveform is prepared using a second FFT, as a CCA failure is detected on one of the carriers, the transmitting transmitter uses the combining operation to combine the separate, prepared transmission waveforms to create a single transmission including both the control/data for itself and the cross-carrier control information.

In general, optimal scheduling in consideration of CCA uncertainty would include the generation of large numbers of waveforms. The number of waveforms is high primarily because a large number of different ways exist to distribute the empty or unused EPDCCH resource blocks (RBs) among all the users. However, constrained scheduling can significantly reduce the complexity the number of waveforms. Additional aspects of the present disclosure provide for adding the waveforms into the transmission after the FFT operations.

In order to fully utilize its resources, a transmitter may prepare multiple signals assuming various different combinations of CCA outcomes from different carriers. For example, in one aspect, a first carrier, Carrier 1 uses 8 resource blocks (RBs) to transmit enhanced physical downlink control channel (EPDCCH) for cross-carrier signaling for Carrier 2. However, if the CCA check fails in Carrier 2, the transmitter may not transmit on Carrier 2, thus, obviating the need for cross-carrier control signaling. Accordingly, Carrier 1 may either re-purpose those 8 RBs for control and data transmissions for its own UEs or may use those 8 RBs for cross-carrier control signaling for other carriers having a clear CCA detected. Alternatively, Carrier 1 may also simply give up those 8 RBs.

Figure 7A:
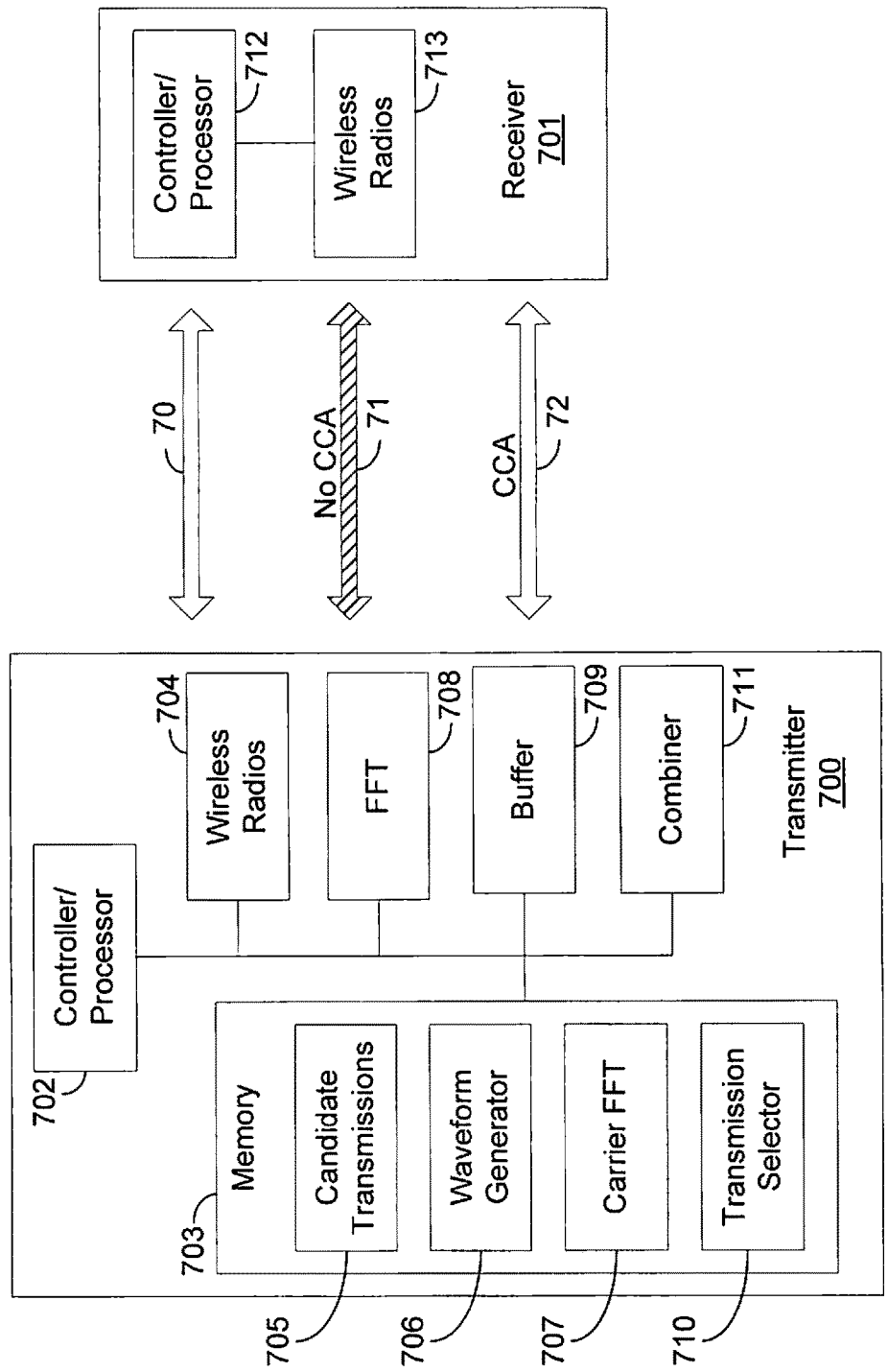
FIG. 7A is a block diagram illustrating a transmitter configured according to one aspect of the present disclosure.

FIG. 7A is a block diagram illustrating a transmitter 700 configured according to one aspect of the present disclosure. Communication between transmitter 700 and receiver 701 occurs over a carrier aggregation of carriers 70-72. Carrier 70 is a guaranteed transmission carrier that is exempt from LBT requirements, while carriers 71 and 72 are non-guaranteed transmission carriers that must perform CCA before transmissions. Carrier 70 is, therefore, designated to carry any cross-carrier control information that may be available depending on the transmission status of carriers 71 and 72. The aspect of the disclosure illustrated in FIG. 7 provides for pre-preparation of separate transmission waveforms for each carrier that may have a clear transmission status. Thus, in accessing candidate transmissions data 705, stored in memory 703, transmitter 700, under control of controller/processor 702, may identify each potential transmission— one for carrier 70, one for carrier 71, and one for carrier 72. Controller/processor 702 executes waveform generator 706, which pre-prepares the individual transmission waveforms for each of carriers 70-72. Each separate waveform is generated using a different FFT. Controller/processor 702 operates FFT 708, the transform component using the different FFTs obtained from carrier FFT data 707, in memory 703. Again, each separate transmission waveform is stored in buffer 709. Control information may also be pre-prepared by generating waveforms that represent the EPDCCH cross-carrier control assignments that would depend on the CCA check results of each of carriers 71 and 72. The pre-prepared cross-carrier control information may also be stored in buffer 709.

In preparation for transmission, transmitter 700 performs CCA checks on carriers 71 and 72. A clear CCA is detected for carrier 72, while the CCA fails for carrier 71. As such, transmitter 700 will be providing transmissions for carrier 70 and cross-carrier control information for carrier 72. Based on these transmissions status results, transmitter 700 executes transmission selector logic 710, under control of controller/processor 702, to select the pre-prepared transmission waveform for carrier 70 and the pre-prepared transmission waveform for carrier 72, stored in buffer 709, and combine the separate waveforms using combiner 711. Controller/processor 702 may also prepare the EPDCCH by combining the pre-prepared waveforms that included the EPDCCH cross-carrier assignments for a successful CCA on carrier 72, using combiner 711 The combined waveforms and EPDCCH are then transmitted using wireless radios 704 over guaranteed transmission carrier 70 to receiver 701. Receiver 701 may then receive the transmission through wireless radios 713 under control of controller/processor 712. Controller/processor 712 operates to separate the combined transmission data and cross-carrier control information for carrier 72.

It should be noted that, as with the combined pre-preparation aspects described above, the separate transmission pre-preparation aspects described herein may cease the pre-preparation once the CCA detection is done and before the next CCA requirement arises.

The RBs used for EPDCCH scheduling are different for each unlicensed carrier, $CC_i$, where 'i' is the index of the particular CC. In general, no common RBs are used for EPDCCH to indicate data on different unlicensed carriers, even when distributed enhanced component carrier element (ECCE) is used. This assumption, therefore, decouples the EPDCCH of different unlicensed carriers allowing independent waveforms to be generated for each CC. The result of such a process may result in sub-optimal utilization of control resources. In case of CCA failure on $CC_i$, the set of users to be scheduled on the EPDCCH resources of $CC_i$ is different for every $CC_i$. Thus, a transmitter, such as the eNB or base station, can do this alternate hypothesis scheduling beforehand. Again, the results may be sub-optimal scheduling.

In order to address such sub-optimal results, various aspects of the present disclosure compute two waveforms per unlicensed carrier. Waveform 1 for CCA success on $CC_i$ contains the EPDCCH for data on $CC_i$, while Waveform 2 for CCA failure on $CC_i$ contains the EPDCCH and data for the PCC. Thus, the total number of waveforms to be computed=2N+1, wherein N represents the total number of unlicensed carriers. One of the waveforms is created with all zeros in the EPDCCH locations. Accordingly, using the aspects described, fewer waveforms are generated as the described aspects would create a linear number based on N while the previous general solution would create an exponential number of waveforms. The correct waveform for $CC_i$ is then added based on the CCA outcome and transmitted to the receiver.

Figure 7B:
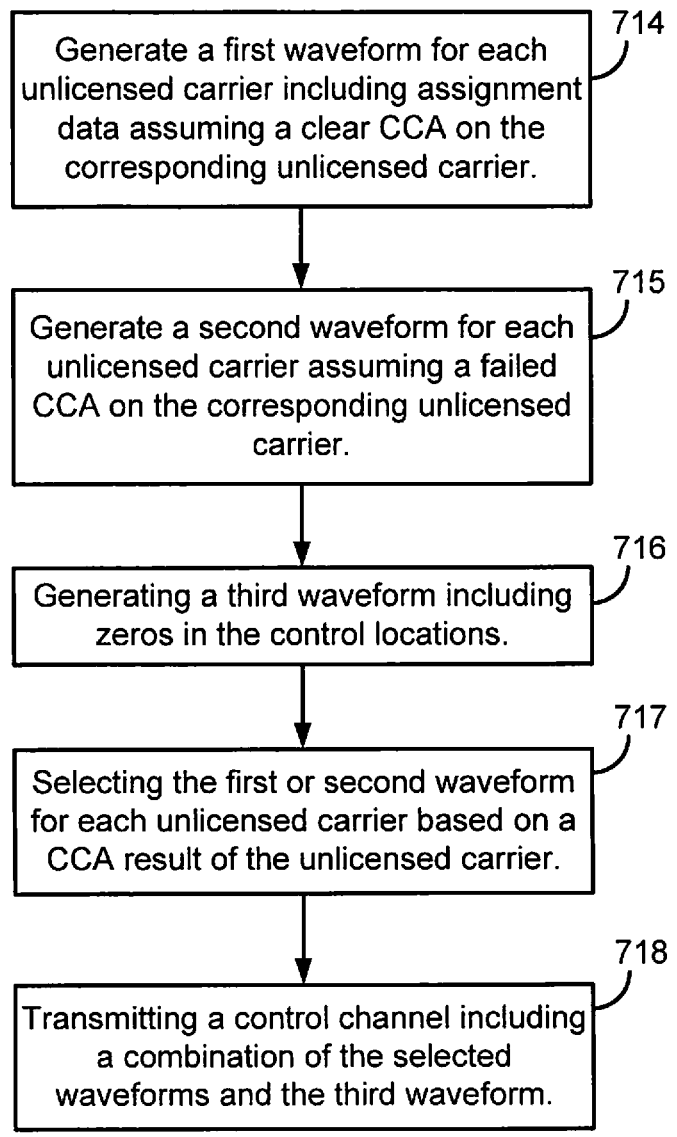
FIG. 7B is a functional block diagram illustrating example blocks executed to implement one aspect of the present disclosure.

FIG. 7B is a functional block diagram illustrating example blocks executed to implement one aspect of the present disclosure. At block 714, a transmitter generates a first waveform for each unlicensed carrier. The first waveforms for each of the unlicensed carriers include EPDCCH for assigning data transmissions on the corresponding carrier. Thus, the first waveforms are generated assuming a clear CCA check for the corresponding carrier.

At block 715, the transmitter generates a second waveform for each unlicensed carrier. The second waveforms for each of the unlicensed carriers include EPDCCH and data for the PCC. As such, the second waveforms are generated assuming a failed CCA check for the corresponding carrier.

At block 716, the transmitter generates a third waveform. The third waveform is generated to include all zeros in the control locations, such as in the EPDCCH locations. Only one of the third waveform types is generated by the transmitter.

At block 717, the transmitter monitors the CCA checks for each of the unlicensed carriers and selects either the first or second waveforms for that carrier based on the CCA results for the carrier. For example, if a failed CCA result is detected for CC 1, then the transmitter selects the second waveform generated for CC1, and if a clear CCA result is detected for CC2, then the transmitter selects the first waveform generated for CC2.

At block 718, the transmitter transmits a control channel, that is the combination of each of the selected waveforms for the unlicensed carriers and the zeroed third waveform. By pre-preparing the two waveforms for each unlicensed carrier, a total of 2N+1 waveforms are pre-prepared by the transmitter, where N is the total number of unlicensed carriers.

Various aspects of the present disclosure may also provide for delaying the start of data transmissions after a fixed number of symbols for the first subframe. However, because a transmitter will begin transmissions on any particular carrier as, soon as a clear detecting in the CCA operation is completed, the transmitter will transmit non-time critical-related transmissions during these first fixed number of symbols. Non-time critical-related transmissions include signals that have no uncertainty relative to CCA operations, such as common reference signals (CRS), channel usage pilot signals (CUPS), channel usage beacon signals (CUBS), and the like. The additional time provided by the fixed number of symbols allows the transmitter to prepare the transmission waveform after the CCA check is successfully detected.

Figure 8B:
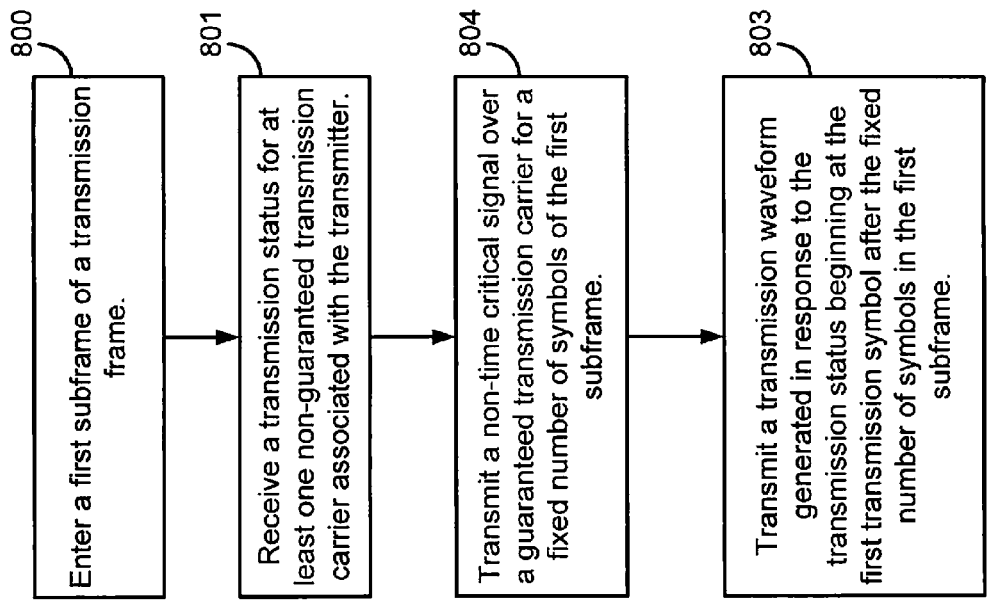
FIGS. 8A and 8B are functional block diagrams illustrating example blocks executed to implement aspects of the present disclosure.
Figure 8A:
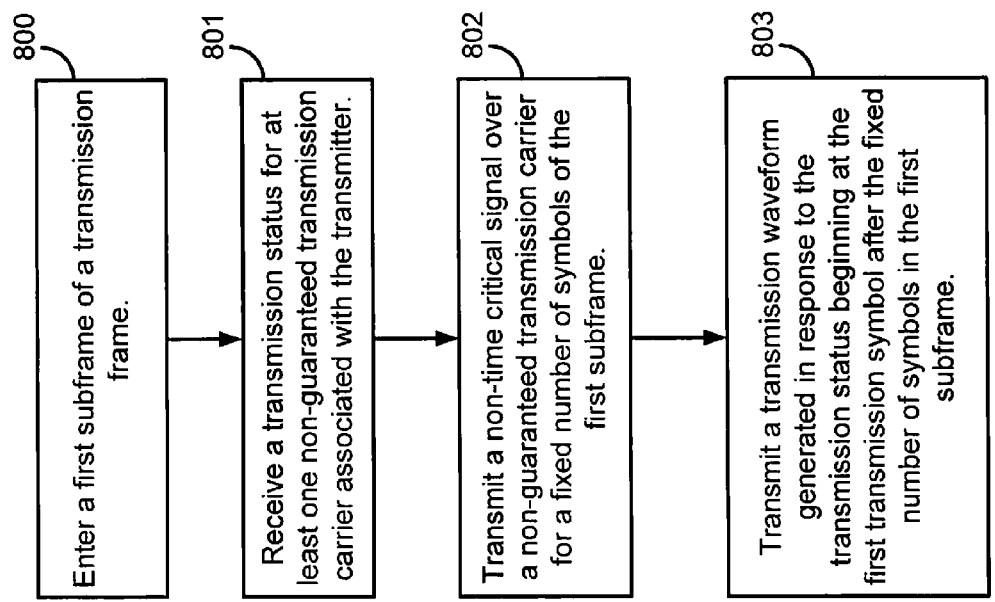

FIG. 8A is a functional block diagram illustrating example blocks executed to implement one aspect of the present disclosure. At block 800, a transmitter enters the first subframe of a transmission frame. The first subframe represents the first subframe for which a CCA check is performed on any non-guaranteed transmission carriers associated with the transmitter. At block 801, the transmitter receives a transmission status for at least one of the non-guaranteed carriers associated with the transmitter. The transmitter may then begin transmitting, at block 802, non-time critical signals over at least one non-guaranteed transmission carriers for a fixed number of symbols in the first subframe. The non-time critical signals, such as CRS, CUPS, CUBS, synchronization signal, channel state information—reference signal (CSI-RS), or a combination thereof, are transmitted while the transmitter generates the transmission waveform based on the received transmission status. In this manner, transmission on the carrier is preserved according to the LBT procedures through transmission of the non-time critical signals while the data/control waveform can be generated once the transmission status is known. At block 803, the transmission waveform, generated in response to the transmission status, is transmitted beginning in the first transmission symbol after the fixed number of symbols carrying the non-time critical signals.

Alternatively, instead of transmitting the non-time critical signals over non-guaranteed transmission carriers, the transmitter may transmit the non-time critical signals over a guaranteed transmission carrier. FIG. 8B is a functional block diagram illustrating a variation of the blocks illustrated in FIG. 8A to implement another aspect of the present disclosure. As with the blocks of FIG. 8A, at block 800, the transmitter enters the first subframe of a transmission frame. The first subframe represents the first subframe for which a CCA check is performed on any non-guaranteed transmission carriers associated with the transmitter. At block 801, the transmitter receives a transmission status for at least one of the non-guaranteed carriers associated with the transmitter. The transmitter may then begin transmitting, at block 804 of the alternative aspect, the non-time critical signals over a guaranteed transmission carrier for a fixed number of symbols in the first subframe. As with the example illustrated in FIG. 8A, the non-time critical signals are transmitted while the transmitter generates the transmission waveform based on the received transmission status. Transmission on the carrier is, thus, preserved according to the LBT procedures through transmission of the non-time critical signals on the guaranteed transmission carrier while the data/control waveform can be generated once the transmission status is known. At block 803, the transmission waveform, generated in response to the transmission status, is transmitted beginning in the first transmission symbol after the fixed number of symbols carrying the non-time critical signals.

Figure 9:
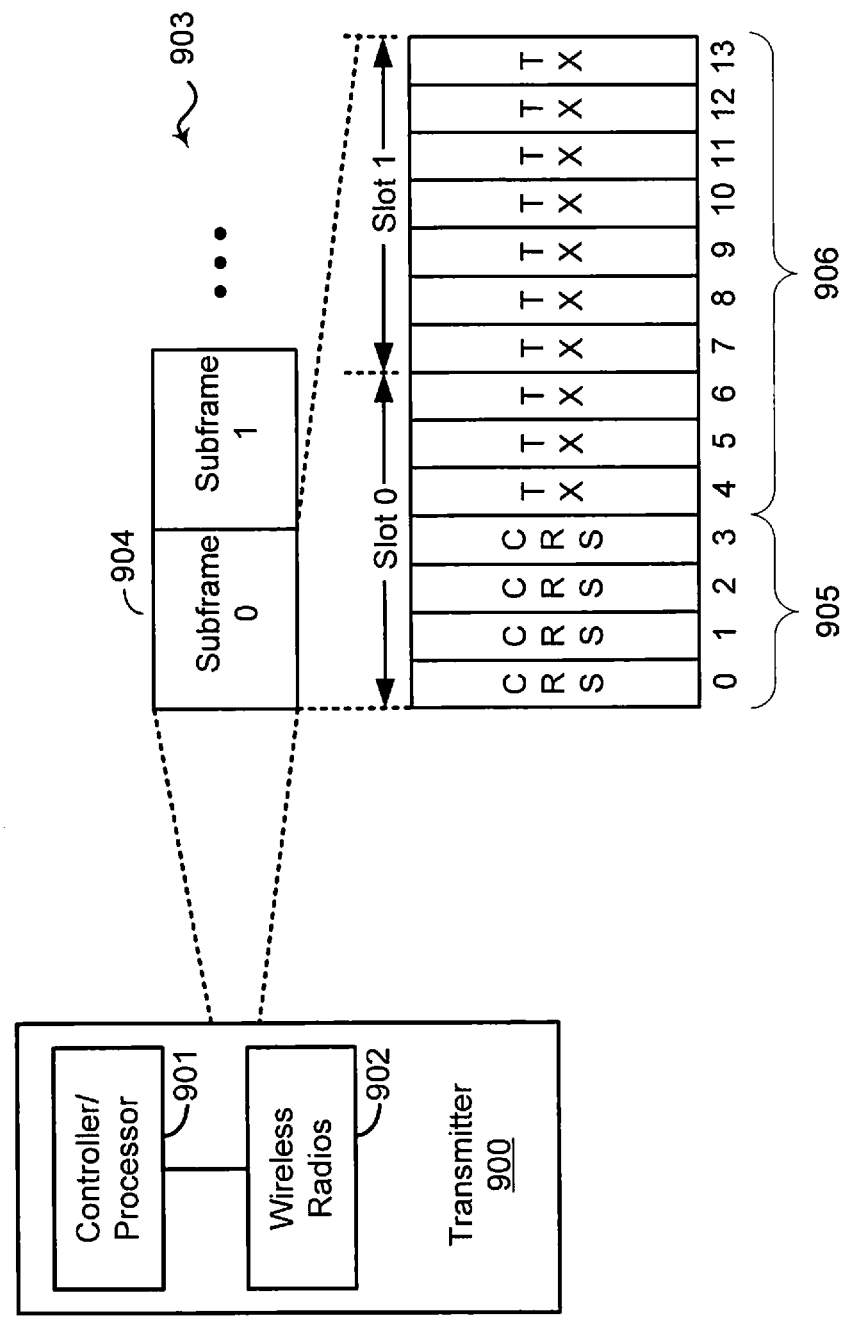
FIG. 9 is a block diagram illustrating transmitter configured according to one aspect of the present disclosure.

FIG. 9 is a block diagram illustrating transmitter 900 configured according to one aspect of the present disclosure. Transmitter 900 includes, among other components, controller/processor 901, which executes the code and controls the various hardware and components that implement the features and functionality of transmitter 900, and wireless radios 902, which, under control of controller/processor 901, transmits the various waveforms to designated receivers. Transmitter 900 is configured to operate according to the procedures illustrated in FIG. 8. When the transmission status of any one or more non-guaranteed transmission carriers is received at transmitter 900, transmissions of non-time critical signals, such as CRS, over at least one non-guaranteed transmission carrier begins in the first set of symbols in first subframe 904 of transmission frame 903. CRS are transmitted in delay symbols region 905. Delay symbols region 905 provides enough time for transmitter 900 to generate the appropriate transmission waveforms in response to and based on the received transmission status of the non-guaranteed transmission carriers. After delay symbols region 905, the actual data/control signals generated based on the transmission status are transmitted in transmission symbols region 906 over the remainder of first subframe 904.

The transmission of the non-time critical signals only occurs in delay symbols region 905 of first subframe 904 of transmission frame 903. After receiving the transmission status, it remains valid for the entire duration of transmission frame 903. Thus, transmitter 900 will not need to transmit such non-time critical signals in a delay symbols region 905 of any other subframe of transmission frame 903.

Figure 10:
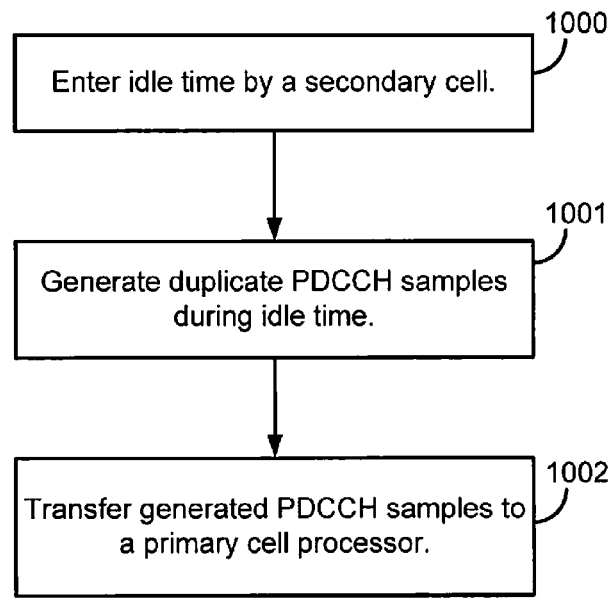
FIG. 10 is a functional block diagram illustrating example blocks executed to implement one aspect of the present disclosure.
Figure 11:
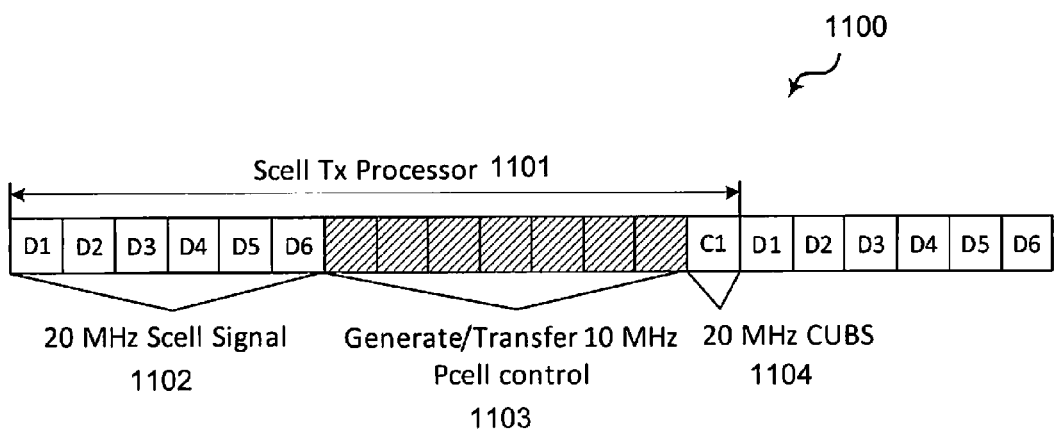
FIG. 11 is a block diagram illustrating a transmission stream of a secondary cell processor configured to perform the blocks identified in FIG. 10.

In another aspect of the present disclosure, the secondary cell processor may generate a duplicate PDCCH during its idle time and then transfer that PDCCH to the primary cell processor in order to pre-prepare or assist the primary cell processor. FIG. 10 is a functional block diagram illustrating example blocks executed to implement one aspect of the present disclosure. FIG. 11 is a block diagram illustrating transmission stream 1100 of a secondary cell processor configured to perform the blocks identified in FIG. 10. At block 1000, the secondary cell processor enters into an idle time. For example, frame 1101 of transmission stream 1100 of the secondary cell processor includes a transmission period 1102, during which the secondary cell process transmits signals in subframes D1-D6. After the transmission at subframe D6, the secondary cell processor enters an idle time 1103.

At block 1001, the secondary cell processor generates duplicate PDCCH samples for the primary cell. Thus, the secondary cell processor generates the duplicate PDCCH samples during idle time 1103.

At block 1002, the secondary cell processor transfers the duplicate PDCCH samples to the primary cell. Prior to beginning CUBS transmission at 1104, the secondary cell processor will transfer the PDCCH samples to the primary cell for the primary cell to add to its cross-carrier assignment transmissions.

Additional aspects of the present disclosure provide for an increase in the amount of time between CCA transmission and transmission of PDCCH/EPDCCH from the primary cell by increasing the CUBS duration. The number of CUBS may be specified in the standards or may be configured by a base station. A base station may need a certain number of symbols, N, lead time from the multiplex to the boundary of the next subframe. One alternative aspect would increase the CUBS duration to a predetermined number of symbols, M, such that the location of the CCA check for the base station would be at least the M symbols prior to PDCCH/EPDCCH transmissions.

Various additional aspects of the present disclosure provide for the base station to always transmit a cross-carrier assignment assuming that the CCA check passes. With cross-carrier assignments always transmitted, the UE would attempt to detect CUBS in order to determine the actual presence of supplemental download (SDL) transmission. If there is a detection error from the UE, there will be a mismatch in UL ACK.

Figure 12:
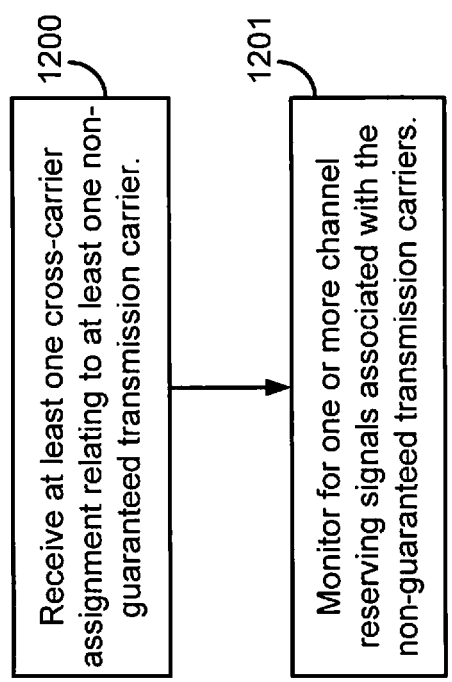

FIG. 12 is a functional block diagram illustrating example blocks executed to implement one aspect of the present disclosure. At block 1200, a mobile device receives at least one cross-carrier assignment relating to at least one non-guaranteed transmission carrier. For example, when the mobile device operates receiving communications over a combination of guaranteed and non-guaranteed carriers, the mobile device will always receive a cross-carrier assignment related to the non-guaranteed carriers which is sent by the primary cell without having detected a clear CCA.

At block 1201, the mobile device monitors for one or more channel reserving signals associated with the non-guaranteed transmission carriers. For example, after receiving the cross-carrier assignment, the mobile device will monitor for any CUBS transmissions associated with those non-guaranteed carriers. If no CUBs are detected, the mobile device may either treat the communication as a false grant and, therefore, enter into discontinuous transmission (DTX) mode. Alternatively, if no CUBS are detected, the mobile device may transmit a NACK and flush any log likelihood ratios (LLRs) associated with any of the data that it may have been attempting to decode. In such cases, the mobile device confirms that the CCA check failed.

If the mobile device detects CUBS transmissions on the non-guaranteed carriers, then the mobile will attempt to decode the data and send either an ACK, if the mobile device successfully decodes the data, or a NACK, if the decoding fails. With the CUBS transmissions detected, the mobile device will store the LLRs associated with the data for combinational decoding, interference cancellation, or the like.

Figure 13:
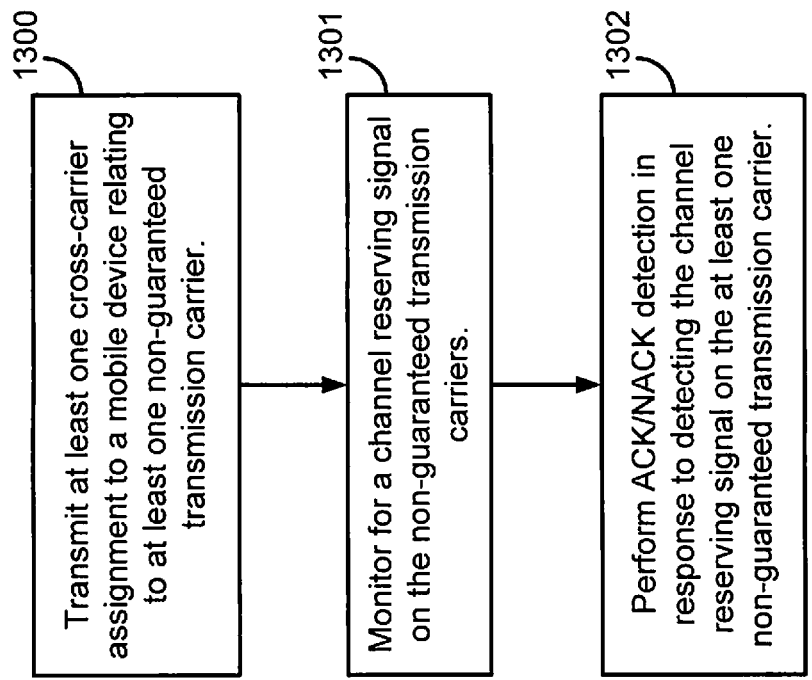
FIGS. 12-15 are functional block diagrams illustrating example blocks executed to implement aspects of the present disclosure.

FIG. 13, is a functional block diagram illustrating example blocks executed to implement one aspect of the present disclosure. At block 1300, a base station transmits at least one cross-carrier assignment to a mobile device relating to at least one non-guaranteed transmission carrier. The base station transmits the cross-carrier assignment for the non-guaranteed carrier even though the CCA check has not been completed.

At block 1301, the base station monitors for channel reserving signals on any of the non-guaranteed carriers. Because the base station sends the cross-carrier assignments assuming a clear CCA check, it now monitors to determine if, in fact, transmissions will be allowed on the non-guaranteed carriers. For example, the base station of the primary cell will listen for CUBS transmissions associated with the non-guaranteed carriers.

At block 1302, the base station performs ACK/NACK detection in response to detecting the channel receiving signals on the non-guaranteed transmission carrier. Because detection of the channel receiving signals, such as CUBS transmissions, on the non-guaranteed carriers means that transmissions are allowed on those carriers, the base station should expect ACK/NACK transmissions from the mobile device to acknowledge the data communications. The base station will also assume that the mobile device has saved any LLRs associated with the data transmissions.

Because a mobile device may transmit a NACK either if CUBS has been detected, but the data was not successfully decoded, and when no CUBS has been transmitted, there may be confusion for the base station whether the data was not correctly decoded or whether CUBS were detected. In such aspects of the disclosure, the mobile device may send a bit indicator along with any NACK transmissions that indicate whether the NACK is transmitted because the mobile device failed to detect CUBS transmissions or whether there was a failure to decode the data when CUBS was transmitted and detected.

Additional aspects of the present disclosure provide for direct scheduling of unlicensed or non-guaranteed carriers directly and only from the secondary cells. With this solution, no cross carrier assignment would be allowed when the secondary cell to be scheduled is subject to CCA or LBT procedure. When considering multiple unlicensed or non-guaranteed secondary cells, each cell will be handled separately from the physical layer (PHY). CCA results on each such carrier may be feedback for joint scheduling of subsequent subframes.

Figures 14, 15:
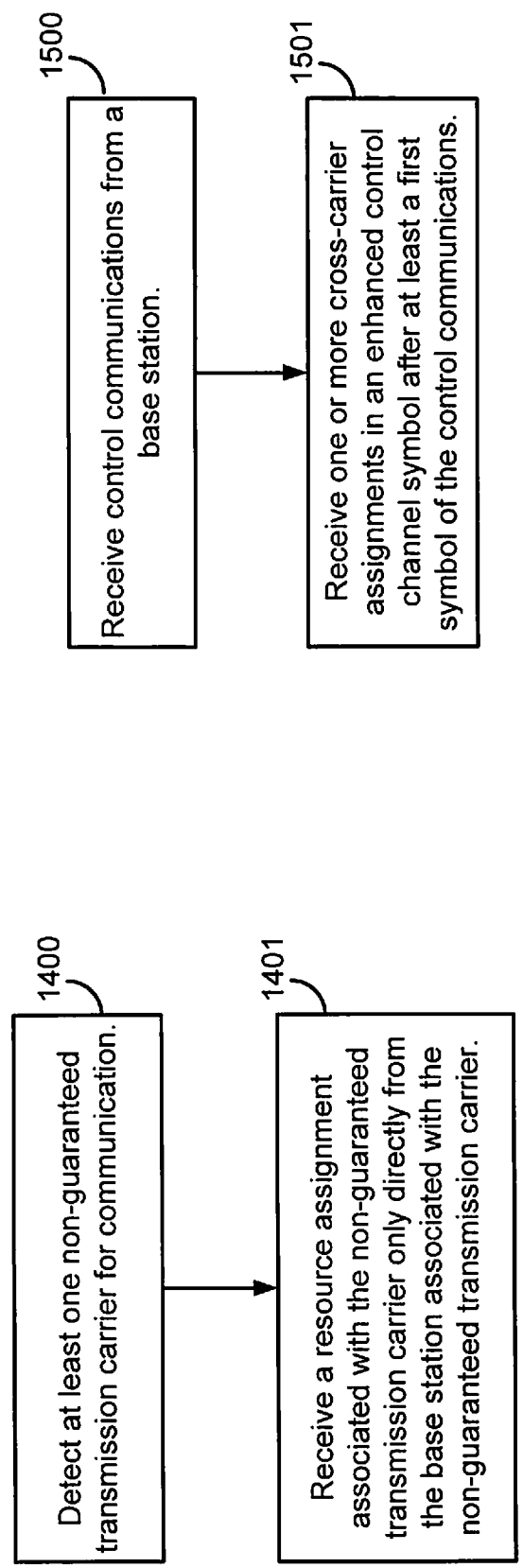

FIG. 14 is a functional block diagram illustrating example blocks executed to implement one aspect of the present disclosure. At block 1400, a mobile device detects at least one non-guaranteed transmission carrier for communication.

At block 1401, the mobile device receives a resource assignment associated with the non-guaranteed carrier directly from the secondary cell associated with that non-guaranteed carrier. As such, the assignments for each non-guaranteed carrier will come only directly from the corresponding secondary cell.

Additional aspects of the present disclosure provide more time for processing by sending all cross-carrier assignments for non-guaranteed transmission carriers in EPDCCH, which occurs in symbols after the first symbol (for PDCCH). Because the EPDCCH occurs in the later symbols, there is more time for cross-carrier assignment preparation. With this solution, all cross-carrier assignments for a frequency subject to CCA or LBT requirements will be transmitted from EPDCCH. Additional aspects may further designate a particular symbol on which to start such EPDCCH.

FIG. 15 is a functional block diagram illustrating example blocks executed to implement one aspect of the present disclosure. At block 1500, a mobile device receives control communications from a primary cell.

At block 1501, the mobile device receives one or more cross-carrier assignments in an enhanced control channel symbol after at least a first symbol of the control communications. For example, the PDCCH may be reserved for transmission in the first symbol of the control communication, the cross-carrier assignments are included in the EPDCCH which is located in later symbols of the transmission. The later symbol location allows more time for such cross-carrier assignment preparation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A, 5B, 7A, 8A, 8B, 10, and 12-15 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   pre-preparing, at a transmitter, a plurality of candidate combined transmission waveforms of cross-carrier control information for one of at least one non-guaranteed transmission carriers and one or more of: control information and data for a guaranteed transmission carrier before detecting a result of a clear channel assessment (CCA);
   receiving, at the transmitter, a transmission status for the at least one non-guaranteed transmission carriers, wherein the transmission status is the result of the CCA to indicate clear transmission or no transmission on the at least one non-guaranteed transmission carriers;

selecting, by the transmitter, a transmission waveform from the plurality of candidate combined transmission waveforms based on the transmission status; and transmitting, by the transmitter, the selected transmission waveform to a receiver.

2. The method of claim 1, wherein the selecting the transmission waveform is performed in response to the received transmission status of the at least one non-guaranteed transmission carriers indicates the clear transmission on the at least one non-guaranteed transmission carriers.

3. The method of claim 1, wherein the plurality of candidate combined transmission waveforms includes:
a cross-carrier control transmission waveform for each of the at least one non-guaranteed transmission carriers, the cross-carrier control transmission wave form including cross-carrier control information associated with the related at least one non-guaranteed transmission carriers; and
a local carrier transmission waveform for the guaranteed transmission carrier, the local carrier transmission waveform including one or more of: control information and data for the guaranteed transmission carrier.

4. The method of claim 3, wherein each of the plurality of candidate combined transmission waveforms is formed using a different transform operation.

5. The method of claim 3, wherein the selecting the transmission waveform includes combining the local carrier transmission waveform with the cross-carrier control transmission waveform for each of the at least one non-guaranteed transmission carriers in which the transmission status received indicates the clear transmission.

6. The method of claim 3, wherein the selecting the transmission waveform includes selecting only the local carrier transmission waveform in response to the received transmission status of the at least one non-guaranteed transmission carriers indicating the no transmission.

7. The method of claim 1, wherein the pre-preparing, the receiving, the selecting, and the transmitting the selected transmission waveform is performed in one of:
a subframe prior to receiving the transmission status; and
a first subframe after a predetermined time from the receiving the transmission status.

8. A method of wireless communication, comprising:
pre-preparing, at a transmitter, a plurality of candidate singular transmission waveforms of one or more of: control information and data for a guaranteed transmission carrier before detecting a result of a clear channel assessment (CCA);
receiving, at the transmitter, a transmission status for at least one non-guaranteed transmission carriers, wherein the transmission status is the result of the CCA to indicate clear transmission or no transmission on the at least one non-guaranteed transmission carriers;
selecting, by the transmitter, a transmission waveform from the plurality of candidate singular transmission waveforms based on the transmission status; and
transmitting, by the transmitter, the selected transmission waveform to a receiver.

9. The method of claim 8, wherein the selecting the transmission waveform is performed in response to the received transmission status of the at least one non-guaranteed transmission carriers indicates the no transmission on the at least one non-guaranteed transmission carriers.

10. The method of claim 8, wherein the pre-preparing, the receiving, the selecting, and the transmitting the selected transmission waveform is performed in one of:
a subframe prior to receiving the transmission status; and
a first subframe after a predetermined time from the receiving the transmission status.

11. A method of wireless communication, comprising:
entering, by a transmitter, a first subframe of a transmission frame;
receiving, at the transmitter, a transmission status for at least one non-guaranteed transmission carriers associated with the transmitter, wherein the transmission status is a result of a clear channel assessment (CCM to indicate clear transmission or no transmission on the at least one non-guaranteed transmission carriers;
transmitting, by the transmitter, a non-time critical signal over a non-guaranteed transmission carrier for a fixed number of symbols of the first subframe after the receiving the transmission status; and
transmitting, by the transmitter, a transmission waveform generated in response to the transmission status beginning at a first transmission symbol after the fixed number of symbols in the first subframe, wherein the transmission waveform is based on the transmission status.

12. The method of claim 11, wherein the transmission waveform waveforms includes one of:
a combined transmission waveform of cross-carrier control information for each of the at least one non-guaranteed transmission carriers having the transmission status indicating the clear transmission and one or more of: control information and data for a guaranteed transmission carrier; or
a singular transmission waveform of the one or more of: control information and data for the guaranteed transmission carrier, when each of the at least one non-guaranteed transmission carriers has the transmission status indicating the no transmission.

13. The method of claim 11, wherein the non-time critical signal includes one or more of: a common reference signal (CRS), a channel usage pilot signal (CUPS), a channel usage beacon signal (CUBS), synchronization signal, CSI-RS, or a combination thereof.

14. A method of wireless communication, comprising:
entering, by a transmitter, a first subframe of a transmission frame;
receiving, at the transmitter, a transmission status for at least one non-guaranteed transmission carriers associated with the transmitter, wherein the transmission status is a result of a clear channel assessment (CCA) to indicate clear transmission or no transmission on the at least one non-guaranteed transmission carriers;
transmitting, by the transmitter, a non-time critical signal over a guaranteed transmission carrier for a fixed number of symbols of the first subframe after the receiving the transmission status; and
transmitting, by the transmitter, a transmission waveform generated in response to the transmission status beginning at a first transmission symbol after the fixed number of symbols in the first subframe, wherein the transmission waveform is based on the transmission status.

15. The method of claim 14, wherein the transmission waveform waveforms includes a singular transmission waveform of the one or more of: control information and data for the guaranteed transmission carrier, when each of the at least one non-guaranteed transmission carriers has the transmission status indicating the no transmission.

16. The method of claim 14, wherein the non-time critical signal includes one or more of: a common reference signal (CRS), a channel usage pilot signal (CUPS), a channel usage beacon signal (CUBS), synchronization signal, CSI-RS, or a combination thereof.

* * * * *